(12) United States Patent
Purswani Ramchandani et al.

(10) Patent No.: US 12,475,483 B2
(45) Date of Patent: *Nov. 18, 2025

(54) METHOD, SYSTEM, AND COMPUTER PROGRAM PRODUCT FOR MATCHING CARD TRANSACTION DATA TO MOBILE APPLICATION USAGE

(71) Applicant: Visa International Service Association, San Francisco, CA (US)

(72) Inventors: Nuri Vinod Purswani Ramchandani, Singapore (SG); Anubhav Narang, Singapore (SG); Olivia Maly, Singapore (SG); Ajit Vilasrao Patil, Cumming, GA (US)

(73) Assignee: Visa International Service Association, San Francisco, CA (US)

( * ) Notice: Subject to any disclaimer, the term of this patent is extended or adjusted under 35 U.S.C. 154(b) by 63 days.

This patent is subject to a terminal disclaimer.

(21) Appl. No.: 18/485,734

(22) Filed: Oct. 12, 2023

(65) Prior Publication Data

US 2024/0037604 A1   Feb. 1, 2024

Related U.S. Application Data

(63) Continuation of application No. 17/121,809, filed on Dec. 15, 2020, now Pat. No. 11,810,153.

(51) Int. Cl.
*G06Q 30/0251* (2023.01)
(52) U.S. Cl.
CPC ..... *G06Q 30/0255* (2013.01); *G06Q 30/0261* (2013.01)
(58) Field of Classification Search
CPC ............... G06Q 30/0255; G06Q 30/0261
See application file for complete search history.

(56) References Cited

U.S. PATENT DOCUMENTS 8,606,630 B2   12/2013   Fordyce, III et al.
8,781,896 B2   7/2014   LeBlanc et al.
(Continued)

FOREIGN PATENT DOCUMENTS

CN   111091417 A       5/2020
EP   0987645 A2 *    3/2000
KR   101525417 B1    6/2015

OTHER PUBLICATIONS

"Dynamic time warping", Wikipedia, 2020, 7 pages, retrieved from https://en.wikipedia.org/wiki/Dynamic_time_warping.
(Continued)

*Primary Examiner* — Mario C. Iosif
(74) *Attorney, Agent, or Firm* — The Webb Law Firm

(57) ABSTRACT

Provided is a method for matching card transaction data to mobile application data. The method may include generating a plurality of regions within a geographic area, each region of the plurality of regions associated with a region identifier. Transaction data associated with an account identifier and mobile application data associated a user identifier may be received. A region for each transaction and for each interaction may be determined based on the transaction and interaction locations. A transaction signature may be generated for each account and an interaction signature may be generated for each user identifier. At least one transaction may be matched to at least one interaction signature. At least one account identifier may be linked to at least one user identifier based on matching the at least one transaction signature to the at least one interaction signature. A system and computer program product are also disclosed.

18 Claims, 5 Drawing Sheets

(56) References Cited

U.S. PATENT DOCUMENTS

| | | | |
|---|---|---|---|
| 10,470,043 B1* | 11/2019 | Cherala | H04W 12/12 |
| 10,909,563 B1 | 2/2021 | Aaron et al. | |
| 2003/0144965 A1 | 7/2003 | Prasad et al. | |
| 2011/0047075 A1 | 2/2011 | Fourez | |
| 2011/0087547 A1 | 4/2011 | Amaro et al. | |
| 2011/0093327 A1 | 4/2011 | Fordyce, III et al. | |
| 2012/0078697 A1 | 3/2012 | Carlson et al. | |
| 2012/0136704 A1 | 5/2012 | Carlson et al. | |
| 2013/0124263 A1 | 5/2013 | Amaro et al. | |
| 2014/0351048 A1 | 11/2014 | Fordyce et al. | |
| 2015/0356560 A1 | 12/2015 | Shastry et al. | |
| 2016/0117781 A1 | 4/2016 | Lee et al. | |
| 2018/0082283 A1 | 3/2018 | Sharma | |
| 2018/0096322 A1* | 4/2018 | D'Agostino | G06F 16/2425 |
| 2019/0102801 A1* | 4/2019 | Lee | G06Q 30/0267 |
| 2020/0300656 A1* | 9/2020 | Weilert | G01C 21/3679 |
| 2020/0394641 A1* | 12/2020 | Omojola | G07F 7/086 |

OTHER PUBLICATIONS

Li et al., "Semint: A tool for identifying attribute correspondences in heterogeneous databases using neural networks", Data & Knowledge Engineering 33.1, 2000, pp. 49-84.

"Needleman-Wunsch algorithm", Wikipedia, 2020, 12 pages, retrieved from https://en.wikipedia.org/wiki/Needleman%E2%80%93Wunsch_algorithm.

Przytycka, "Lecture 2: Pairwise sequence alignment.", Principles Computational Biology, 2002, 51 pages, retrieved from https://www.ncbi.nlm.nih.gov/CBBresearch/Przytycka/download/lectures/PCB_Lect02_Pairwise_allign.pdf.

\* cited by examiner

METHOD, SYSTEM, AND COMPUTER PROGRAM PRODUCT FOR MATCHING CARD TRANSACTION DATA TO MOBILE APPLICATION USAGE

CROSS-REFERENCE TO RELATED APPLICATION

This application is a continuation of U.S. application Ser. No. 17/121,809, filed Dec. 15, 2020, the disclosure of which is incorporated herein in its entirety by reference.

BACKGROUND

1. Field

This disclosed subject matter relates generally to methods, systems, and products for matching unrelated data sets and, in some particular embodiments or aspects, to a method, system, and computer program product for matching unrelated card transaction data to mobile application data.

2. Technical Considerations

With the growth of the usage of smart phones and other technologies, there has been a large increase in anonymized data available about users, including purchasing information, transaction information, mobile phone application information, banking information, location information, and/or the like. This information can be used to better understand users in order to determine their preferences and to allow for more targeted advertisements to gain new customers or grow existing customers. However, various types of data are often found in separate databases such that there may not be a key to easily join data from one group with the data of another group. For example, there is no common identifier between mobile phone application information and transaction information. Therefore, it is necessary to be able to match the data from one database to the data of another database to identify the same user's information between both databases.

SUMMARY

Accordingly, it is an object of the presently disclosed subject matter to provide methods, systems, and computer program products for matching card transaction data to mobile application data.

According to non-limiting embodiments or aspects, provided is a method for matching card transaction data to mobile application data. In some non-limiting embodiments or aspects, a method for matching card transaction data to mobile application data may include generating, with at least one processor, a plurality of regions within a geographic area, each region of the plurality of regions associated with a region identifier; receiving, with at least one processor, transaction data associated with a plurality of transactions conducted between a plurality of accounts and a plurality of merchants using a plurality of account identifiers, the transaction data comprising, for each transaction, an account identifier and a transaction location; receiving, with at least one processor, mobile application data associated with a plurality of interactions between a plurality of mobile device users and at least one mobile application using a plurality of user identifiers, the mobile application data comprising, for each interaction, a user identifier and an interaction location; determining, with at least one processor, a region of the plurality of regions for each transaction of the plurality of transactions based on the transaction location; determining, with at least one processor, a region of the plurality of regions for each interaction of the plurality of interactions based on the interaction location; generating, with at least one processor, a transaction signature for each account identifier of the plurality of account identifiers based on the region for each transaction of the plurality of interactions initiated with the account identifier, resulting in a plurality of transaction signatures; generating, with at least one processor, an interaction signature for each user identifier of the plurality of user identifiers based on the region for each interaction of the plurality of interactions associated with a corresponding user identifier, resulting in a plurality of interaction signatures; matching, with at least one processor, at least one transaction signature of the plurality of transaction signatures to at least one interaction signature of the plurality of interaction signatures; and linking, with at least one processor, at least one account identifier of the plurality of account identifiers to at least one user identifier of the plurality of user identifiers based on matching the at least one transaction signature to the at least one interaction signature.

In some non-limiting embodiments or aspects, the computer-implemented method may include generating, with at least one processor, a plurality of new regions within the geographic area if at least two account identifiers of the plurality of account identifiers are linked to one user identifier of the plurality of user identifiers, wherein at least two new regions of the plurality of new regions overlap with a region for at least one transaction initiated with at least one linked account identifier; determining, with at least one processor, a new region of the plurality of new regions for each transaction of the plurality of transactions associated with the at least two linked account identifiers based on the transaction location, wherein at least two transactions of the plurality of transactions associated with the at least two linked account identifiers located in the same region are located in different new regions; determining, with at least one processor, a new region of the plurality of new regions for each interaction of the plurality of interactions associated with the linked user identifier based on the interaction location; generating, with at least one processor, a new transaction signature for each linked account identifier based on the new region for each transaction of the plurality of transactions associated with the at least two linked account identifiers, resulting in a plurality of new transaction signatures; generating, with at least one processor, a new interaction signature for the linked user identifier based on the new region for each interaction of the plurality of interactions associated with the linked user identifier, resulting in a new interaction signature; matching, with at least one processor, one new transaction signature of the plurality of new transaction signatures to the new interaction signature; and linking, with at least one processor, one account identifier of the plurality of account identifiers to one user identifier of the plurality of user identifiers based on matching the one new transaction signature to the new interaction signature.

In some non-limiting embodiments or aspects, the computer-implemented method may include generating, with at least one processor, a plurality of new regions within the geographic area if one account identifier of the plurality of account identifiers is linked to at least two user identifiers of the plurality of user identifiers, wherein at least two new regions of the plurality of new regions overlap with a region for at least one interaction initiated with at least one linked user identifier; determining, with at least one processor, a new region of the plurality of new regions for each interaction of the plurality of interactions associated with the at least two linked user identifiers based on the interaction location wherein at least two interactions of the plurality of interactions associated with the at least two linked user identifiers that are located in the same region are located in different new regions; determining, with at least one processor, a new region of the plurality of new regions for each transaction of the plurality of transactions associated with the linked account identifier based on the transaction location; generating, with at least one processor, a new transaction signature for the linked account identifier based on the new region for each transaction of the plurality of transactions associated with the linked account identifier, resulting in a new transaction signature; generating, with at least one processor, a new interaction signature for each linked user identifier based on the new region for each interaction of the plurality of interactions associated with the at least two linked user identifiers, resulting in a plurality of new interaction signatures; matching, with at least one processor, the new transaction signature to one new interaction signature of the plurality of new interaction signatures; and linking, with at least one processor, one account identifier of the plurality of account identifiers to one user identifier of the plurality of user identifiers based on matching the new transaction signature to the at least one new interaction signature.

In some non-limiting embodiments or aspects the transaction data associated with the plurality of transactions comprises a transaction time and/or the mobile application data associated with the plurality of interactions comprises a time of interaction; and generating the transaction signature for each account identifier of the plurality of account identifiers data is further based on the transaction time or generating the interaction signature for each user identifier of the plurality of user identifiers is further based on the time of interaction. Matching at least one transaction signature of the plurality of transaction signatures to at least one interaction signature of the plurality of interaction signatures is based on a difference between the transaction time and the time of interaction satisfying a predetermined threshold.

In some non-limiting embodiments or aspects, if at least two account identifiers are linked to one user identifier and/or at least two user identifiers are linked to one account identifier, the method may include shortening, with at least one processor, the predetermined threshold; matching, with at least one processor, at least one transaction signature of the plurality of transaction signatures to at least one interaction signature of the plurality of interaction signatures; and linking, with at least one processor, at least one account identifier of the plurality of account identifiers to at least one user identifier of the plurality of user identifiers based on matching the at least one transaction signature to the at least one interaction signature.

In some non-limiting embodiments or aspects, the computer-implemented method may include generating, with at least one processor, a plurality of neighborhoods, wherein each neighborhood of the plurality of neighborhoods encompasses a center region and all regions adjacent to the center region; determining, with at least one processor, a neighborhood of the plurality of neighborhoods for each transaction of the plurality of transactions based on the transaction location; determining, with at least one processor, a neighborhood of the plurality of neighborhoods for each interaction of the plurality of interactions based on the interaction location; generating, with at least one processor, a match score, wherein the match score is calculated based on a distance between a neighborhood of a transaction of the plurality of transactions and a neighborhood of an interaction of the plurality of interactions; and matching, with at least one processor, at least one transaction signature of the plurality of transaction signatures to at least one interaction signature of the plurality of interaction signatures based on the match score.

According to non-limiting embodiments or aspects, provided is a system for matching card transaction data to mobile application data. In some non-limiting embodiments or aspects, the system for matching card transaction data to mobile application data may include at least one processor; and at least one non-transitory computer readable medium including one or more instructions that, when executed by the at least one processor, cause the at least one processor to: generate a plurality of regions within a geographic area, each region of the plurality of regions associated with a region identifier; receive transaction data associated with a plurality of transactions conducted between a plurality of accounts and a plurality of merchants using a plurality of account identifiers, the transaction data comprising, for each transaction, an account identifier and a transaction location; receive mobile application data associated with a plurality of interactions between a plurality of mobile device users and at least one mobile application using a plurality of user identifiers, the mobile application data comprising, for each interaction, a user identifier and an interaction location; determine a region of the plurality of regions for each transaction of the plurality of transactions based on the transaction location; determine a region of the plurality of regions for each interaction of the plurality of interactions based on the interaction location; generate a transaction signature for each account identifier of the plurality of account identifiers based on the region for each transaction of the plurality of transactions initiated with the account identifier, resulting in a plurality of transaction signatures; generate an interaction signature for each user identifier of the plurality of user identifiers based on the region for each interaction of the plurality of interactions associated with a corresponding user identifier, resulting in a plurality of interaction signatures; match at least one transaction signature of the plurality of transaction signatures to at least one interaction signature of the plurality of interaction signatures; and link at least one account identifier of the plurality of account identifiers to at least one user identifier of the plurality of user identifiers based on matching the at least one transaction signature to the at least one interaction signature.

In some non-limiting embodiments or aspects, the one or more instructions further cause the at least one processor to: generate a plurality of new regions within the geographic area if at least two account identifiers of the plurality of account identifiers are linked to one user identifier of the plurality of user identifiers, wherein at least two new regions of the plurality of new regions overlap with a region for at least one transaction initiated with at least one linked account identifier; determine a new region of the plurality of new regions for each transaction of the plurality of transactions associated with the at least two linked account identifiers based on the transaction location, wherein at least two transactions of the plurality of transactions associated with the at least two linked account identifiers located in the same region are located in different new regions; determine a new region of the plurality of new regions for each interaction of the plurality of interactions associated with the linked user identifier based on the interaction location; generate a new transaction signature for each linked account identifier based on the new region for each transaction of the plurality of transactions associated with the at least two linked account identifiers, resulting in a plurality of new transaction signatures; generate a new interaction signature for the linked user identifier based on the new region for each interaction of the plurality of interactions associated with the linked user identifier, resulting in a new interaction signature; match one new transaction signature of the plurality of new transaction signatures to the new interaction signature; and link one account identifier of the plurality of account identifiers to one user identifier of the plurality of user identifiers based on matching the one new transaction signature to the new interaction signature.

In some non-limiting embodiments or aspects, the one or more instructions further cause the at least one processor to: generate a plurality of new regions within the geographic area if one account identifier of the plurality of account identifiers is linked to at least two user identifiers of the plurality of user identifiers, wherein at least two new regions of the plurality of new regions overlap with a region for at least one interaction initiated with at least one linked user identifier; determine a new region of the plurality of new regions for each interaction of the plurality of interactions associated with the at least two linked user identifiers based on the interaction location wherein at least two interactions of the plurality of interactions associated with the at least two linked user identifiers that are located in the same region are located in different new regions; determine a new region of the plurality of new regions for each transaction of the plurality of transactions associated with the linked account identifier based on the transaction location; generate a new transaction signature for the linked account identifier based on the new region for each transaction of the plurality of transactions associated with the linked account identifier, resulting in a new transaction signature; generate a new interaction signature for each linked user identifier based on the new region for each interaction of the plurality of interactions associated with the at least two linked user identifiers, resulting in a plurality of new interaction signatures; match the new transaction signature to one new interaction signature of the plurality of new interaction signatures; and link one account identifier of the plurality of account identifiers to one user identifier of the plurality of user identifiers based on matching the new transaction signature to the at least one new interaction signature.

In some non-limiting embodiments or aspects, the transaction data associated with the plurality of transactions comprises a transaction time and/or the mobile application data associated with the plurality of interactions comprises a time of interaction; and generating the transaction signature for each account identifier of the plurality of account identifiers data is further based on the transaction time or generating the interaction signature for each user identifier of the plurality of user identifiers is further based on the time of interaction. Matching at least one transaction signature of the plurality of transaction signatures to at least one interaction signature of the plurality of interaction signatures is based on a difference between the transaction time and the time of interaction satisfying a predetermined threshold.

In some non-limiting embodiments or aspects, if at least two account identifiers are linked to one user identifier and/or at least two user identifiers are linked to one account identifier, the one or more instructions further cause the at least one processor to: shorten the predetermined threshold; match at least one transaction signature of the plurality of transaction signatures to at least one interaction signature of the plurality of interaction signatures; and link at least one account identifier of the plurality of account identifiers to at least one user identifier of the plurality of user identifiers based on matching the at least one transaction signature to the at least one interaction signature.

In some non-limiting embodiments or aspects, the one or more instructions further cause the at least one processor to: generate a plurality of neighborhoods, wherein each neighborhood of the plurality of neighborhoods encompasses a center region and all regions adjacent to the center region; determine a neighborhood of the plurality of neighborhoods for each transaction of the plurality of transactions based on the transaction location; determine a neighborhood of the plurality of neighborhoods for each interaction of the plurality of interactions based on the interaction location; generate a match score, wherein the match score is calculated based on a distance between a neighborhood of a transaction of the plurality of transactions and a neighborhood of an interaction of the plurality of interactions; and match at least one transaction signature of the plurality of transaction signatures to at least one interaction signature of the plurality of interaction signatures based on the match score.

According to non-limiting embodiments or aspects, provided is a computer program product for matching card transaction data to mobile application data. The computer program product may include at least one non-transitory computer-readable medium including one or more instructions that, when executed by at least one processor, cause the at least one processor to generate a plurality of regions within a geographic area, each region of the plurality of regions associated with a region identifier; receive transaction data associated with a plurality of transactions conducted between a plurality of accounts and a plurality of merchants using a plurality of account identifiers, the transaction data comprising, for each transaction, an account identifier and a transaction location; receive mobile application data associated with a plurality of interactions between a plurality of mobile device users and at least one mobile application using a plurality of user identifiers, the mobile application data comprising, for each interaction, a user identifier and an interaction location; determine a region of the plurality of regions for each transaction of the plurality of transactions based on the transaction location; determine a region of the plurality of regions for each interaction of the plurality of interactions based on the interaction location; generate a transaction signature for each account identifier of the plurality of account identifiers based on the region for each transaction of the plurality of transactions initiated with the account identifier, resulting in a plurality of transaction signatures; generate an interaction signature for each user identifier of the plurality of user identifiers based on the region for each interaction of the plurality of interactions associated with a corresponding user identifier, resulting in a plurality of interaction signatures; match at least one transaction signature of the plurality of transaction signatures to at least one interaction signature of the plurality of interaction signatures; and link at least one account identifier of the plurality of account identifiers to at least one user identifier of the plurality of user identifiers based on matching the at least one transaction signature to the at least one interaction signature.

In some non-limiting embodiments or aspects, the one or more instructions further cause the at least one processor to: generate a plurality of new regions within the geographic area if at least two account identifiers of the plurality of account identifiers are linked to one user identifier of the plurality of user identifiers, wherein at least two new regions of the plurality of new regions overlap with a region for at least one transaction initiated with at least one linked account identifier; determine a new region of the plurality of new regions for each transaction of the plurality of transactions associated with the at least two linked account identifiers based on the transaction location, wherein at least two transactions of the plurality of transactions associated with the at least two linked account identifiers located in the same region are located in different new regions; determine a new region of the plurality of new regions for each interaction of the plurality of interactions associated with the linked user identifier based on the interaction location; generate a new transaction signature for each linked account identifier based on the new region for each transaction of the plurality of transactions associated with the at least two linked account identifiers, resulting in a plurality of new transaction signatures; generate a new interaction signature for the linked user identifier based on the new region for each interaction of the plurality of interactions associated with the linked user identifier, resulting in a new interaction signature; match one new transaction signature of the plurality of new transaction signatures to the new interaction signature; and link one account identifier of the plurality of account identifiers to one user identifier of the plurality of user identifiers based on matching the one new transaction signature to the new interaction signature.

In some non-limiting embodiments or aspects, the one or more instructions further cause the at least one processor to: generate a plurality of new regions within the geographic area if one account identifier of the plurality of account identifiers is linked to at least two user identifiers of the plurality of user identifiers, wherein at least two new regions of the plurality of new regions overlap with a region for at least one interaction initiated with at least one linked user identifier; determine a new region of the plurality of new regions for each interaction of the plurality of interactions associated with the at least two linked user identifiers based on the interaction location wherein at least two interactions of the plurality of interactions associated with the at least two linked user identifiers that are located in the same region are located in different new regions; determine a new region of the plurality of new regions for each transaction of the plurality of transactions associated with the linked account identifier based on the transaction location; generate a new transaction signature for the linked account identifier based on the new region for each transaction of the plurality of transactions associated with the linked account identifier, resulting in a new transaction signature; generate a new interaction signature for each linked user identifier based on the new region for each interaction of the plurality of interactions associated with the at least two linked user identifiers, resulting in a plurality of new interaction signatures; match the new transaction signature to one new interaction signature of the plurality of new interaction signatures; and link one account identifier of the plurality of account identifiers to one user identifier of the plurality of user identifiers based on matching the new transaction signature to the at least one new interaction signature.

In some non-limiting embodiments or aspects, the transaction data associated with the plurality of transactions comprises a transaction time and/or the mobile application data associated with the plurality of interactions comprises a time of interaction; and generating the transaction signature for each account identifier of the plurality of account identifiers data is further based on the transaction time or generating the interaction signature for each user identifier of the plurality of user identifiers is further based on the time of interaction. Matching at least one transaction signature of the plurality of transaction signatures to at least one interaction signature of the plurality of interaction signatures is based on a difference between the transaction time and the time of interaction satisfying a predetermined threshold.

In some non-limiting embodiments or aspects, the one or more instructions further cause the at least one processor to: generate a plurality of neighborhoods, wherein each neighborhood of the plurality of neighborhoods encompasses a center region and all regions adjacent to the center region; determine a neighborhood of the plurality of neighborhoods for each transaction of the plurality of transactions based on the transaction location; determine a neighborhood of the plurality of neighborhoods for each interaction of the plurality of interactions based on the interaction location; generate a match score, wherein the match score is calculated based on a distance between a neighborhood of a transaction of the plurality of transactions and a neighborhood of an interaction of the plurality of interactions; and match at least one transaction signature of the plurality of transaction signatures to at least one interaction signature of the plurality of interaction signatures based on the match score.

According to non-limiting embodiments or aspects, provided is a method for matching card transaction data to mobile application data. In some non-limiting embodiments or aspects, a method for matching card transaction data to mobile application data may include generating, with at least one processor, a plurality of regions within a geographic area, each region of the plurality of regions associated with a region identifier; processing, with at least one processor, transaction data associated with a plurality of transactions conducted between a plurality of accounts and a plurality of merchants to determine, for each transaction, a region of the plurality of regions in which the transaction occurred; processing, with at least one processor, mobile application data associated with a plurality of interactions between a plurality of mobile device users and at least one mobile application to determine, for each interaction, a region of the plurality of regions in which the interaction occurred; generating, with at least one processor, a transaction signature for each account identifier of the plurality of account identifiers based on the region of each transaction initiated with the account identifier, resulting in a plurality of transaction signatures; generating, with at least one processor, an interaction signature for each user identifier of the plurality of user identifiers based on the region of each interaction associated with a corresponding user identifier, resulting in a plurality of interaction signatures; matching, with at least one processor, at least one transaction signature of the plurality of transaction signatures to at least one interaction signature of the plurality of interaction signatures; and linking, with at least one processor, at least one account identifier of the plurality of account identifiers to at least one user identifier of the plurality of user identifiers based on matching the at least one transaction signature to the at least one interaction signature.

According to non-limiting embodiments or aspects, provided is a system for matching card transaction data to mobile application data. In some non-limiting embodiments or aspects, the system for matching card transaction data to mobile application data may include at least one processor; and at least one non-transitory computer readable medium including one or more instructions that, when executed by the at least one processor, cause the at least one processor to: generate, with at least one processor, a plurality of regions within a geographic area, each region of the plurality of regions associated with a region identifier; process, with at least one processor, transaction data associated with a plurality of transactions conducted between a plurality of accounts and a plurality of merchants to determine, for each transaction, a region of the plurality of regions in which the transaction occurred; process, with at least one processor, mobile application data associated with a plurality of interactions between a plurality of mobile device users and at least one mobile application to determine, for each interaction, a region of the plurality of regions in which the interaction occurred; generate, with at least one processor, a transaction signature for each account identifier of the plurality of account identifiers based on the region of each transaction initiated with the account identifier, resulting in a plurality of transaction signatures; generate, with at least one processor, an interaction signature for each user identifier of the plurality of user identifiers based on the region of each interaction associated with a corresponding user identifier, resulting in a plurality of interaction signatures; match, with at least one processor, at least one transaction signature of the plurality of transaction signatures to at least one interaction signature of the plurality of interaction signatures; and link, with at least one processor, at least one account identifier of the plurality of account identifiers to at least one user identifier of the plurality of user identifiers based on matching the at least one transaction signature to the at least one interaction signature.

According to non-limiting embodiments or aspects, provided is a computer program product for matching card transaction data to mobile application data. The computer program product may include at least one non-transitory computer-readable medium including one or more instructions that, when executed by at least one processor, cause the at least one processor to generate, with at least one processor, a plurality of regions within a geographic area, each region of the plurality of regions associated with a region identifier; process, with at least one processor, transaction data associated with a plurality of transactions conducted between a plurality of accounts and a plurality of merchants to determine, for each transaction, a region of the plurality of regions in which the transaction occurred; process, with at least one processor, mobile application data associated with a plurality of interactions between a plurality of mobile device users and at least one mobile application to determine, for each interaction, a region of the plurality of regions in which the interaction occurred; generate, with at least one processor, a transaction signature for each account identifier of the plurality of account identifiers based on the region of each transaction initiated with the account identifier, resulting in a plurality of transaction signatures; generate, with at least one processor, an interaction signature for each user identifier of the plurality of user identifiers based on the region of each interaction associated with a corresponding user identifier, resulting in a plurality of interaction signatures; match, with at least one processor, at least one transaction signature of the plurality of transaction signatures to at least one interaction signature of the plurality of interaction signatures; and link, with at least one processor, at least one account identifier of the plurality of account identifiers to at least one user identifier of the plurality of user identifiers based on matching the at least one transaction signature to the at least one interaction signature.

Further embodiments or aspects are set forth in the following numbered clauses:

Clause 1: A computer-implemented method, comprising: generating, with at least one processor, a plurality of regions within a geographic area, each region of the plurality of regions associated with a region identifier; receiving, with at least one processor, transaction data associated with a plurality of transactions conducted between a plurality of accounts and a plurality of merchants using a plurality of account identifiers, the transaction data comprising, for each transaction, an account identifier and a transaction location; receiving, with at least one processor, mobile application data associated with a plurality of interactions between a plurality of mobile device users and at least one mobile application using a plurality of user identifiers, the mobile application data comprising, for each interaction, a user identifier and an interaction location; determining, with at least one processor, a region of the plurality of regions for each transaction of the plurality of transactions based on the transaction location; determining, with at least one processor, a region of the plurality of regions for each interaction of the plurality of interactions based on the interaction location; generating, with at least one processor, a transaction signature for each account identifier of the plurality of account identifiers based on the region for each transaction of the plurality of transactions initiated with the account identifier, resulting in a plurality of transaction signatures; generating, with at least one processor, an interaction signature for each user identifier of the plurality of user identifiers based on the region for each interaction of the plurality of interactions associated with a corresponding user identifier, resulting in a plurality of interaction signatures; matching, with at least one processor, at least one transaction signature of the plurality of transaction signatures to at least one interaction signature of the plurality of interaction signatures; and linking, with at least one processor, at least one account identifier of the plurality of account identifiers to at least one user identifier of the plurality of user identifiers based on matching the at least one transaction signature to the at least one interaction signature.

Clause 2: The computer-implemented method of clause 1, further comprising: generating, with at least one processor, a plurality of new regions within the geographic area if at least two account identifiers of the plurality of account identifiers are linked to one user identifier of the plurality of user identifiers, wherein at least two new regions of the plurality of new regions overlap with a region for at least one transaction initiated with at least one linked account identifier; determining, with at least one processor, a new region of the plurality of new regions for each transaction of the plurality of transactions associated with the at least two linked account identifiers based on the transaction location, wherein at least two transactions of the plurality of transactions associated with the at least two linked account identifiers located in the same region are located in different new regions; determining, with at least one processor, a new region of the plurality of new regions for each interaction of the plurality of interactions associated with the linked user identifier based on the interaction location; generating, with at least one processor, a new transaction signature for each linked account identifier based on the new region for each transaction of the plurality of transactions associated with the at least two linked account identifiers, resulting in a plurality of new transaction signatures; generating, with at least one processor, a new interaction signature for the linked user identifier based on the new region for each interaction of the plurality of interactions associated with the linked user identifier, resulting in a new interaction signature; matching, with at least one processor, one new transaction signature of the plurality of new transaction signatures to the new interaction signature; and linking, with at least one processor, one account identifier of the plurality of account identifiers to one user identifier of the plurality of user identifiers based on matching the one new transaction signature to the new interaction signature.

Clause 3: The computer-implemented method of clauses 1 or 2, further comprising: generating, with at least one processor, a plurality of new regions within the geographic area if one account identifier of the plurality of account identifiers is linked to at least two user identifiers of the plurality of user identifiers, wherein at least two new regions of the plurality of new regions overlap with a region for at least one interaction initiated with at least one linked user identifier; determining, with at least one processor, a new region of the plurality of new regions for each interaction of the plurality of interactions associated with the at least two linked user identifiers based on the interaction location wherein at least two interactions of the plurality of interactions associated with the at least two linked user identifiers that are located in the same region are located in different new regions; determining, with at least one processor, a new region of the plurality of new regions for each transaction of the plurality of transactions associated with the linked account identifier based on the transaction location; generating, with at least one processor, a new transaction signature for the linked account identifier based on the new region for each transaction of the plurality of transactions associated with the linked account identifier, resulting in a new transaction signature; generating, with at least one processor, a new interaction signature for each linked user identifier based on the new region for each interaction of the plurality of interactions associated with the at least two linked user identifiers, resulting in a plurality of new interaction signatures; matching, with at least one processor, the new transaction signature to one new interaction signature of the plurality of new interaction signatures; and linking, with at least one processor, one account identifier of the plurality of account identifiers to one user identifier of the plurality of user identifiers based on matching the new transaction signature to the at least one new interaction signature.

Clause 4: The computer-implemented method of any of clauses 1-3, wherein the transaction data associated with the plurality of transactions comprises a transaction time and/or the mobile application data associated with the plurality of interactions comprises a time of interaction; and wherein generating the transaction signature for each account identifier of the plurality of account identifiers data is further based on the transaction time or generating the interaction signature for each user identifier of the plurality of user identifiers is further based on the time of interaction.

Clause 5: The computer-implemented method of any of clauses 1-4, wherein matching at least one transaction signature of the plurality of transaction signatures to at least one interaction signature of the plurality of interaction signatures is based on a difference between the transaction time and the time of interaction satisfying a predetermined threshold.

Clause 6: The computer-implemented method of any of clauses 1-5, at least two account identifiers are linked to one user identifier and/or at least two user identifiers are linked to one account identifier, the method further comprising: shortening, with at least one processor, the predetermined threshold; matching, with at least one processor, at least one transaction signature of the plurality of transaction signatures to at least one interaction signature of the plurality of interaction signatures; and linking, with at least one processor, at least one account identifier of the plurality of account identifiers to at least one user identifier of the plurality of user identifiers based on matching the at least one transaction signature to the at least one interaction signature.

Clause 7: The computer-implemented method of any of clauses 1-6, further comprising: generating, with at least one processor, a plurality of neighborhoods, wherein each neighborhood of the plurality of neighborhoods encompasses a center region and all regions adjacent to the center region; determining, with at least one processor, a neighborhood of the plurality of neighborhoods for each transaction of the plurality of transactions based on the transaction location; determining, with at least one processor, a neighborhood of the plurality of neighborhoods for each interaction of the plurality of interactions based on the interaction location; generating, with at least one processor, a match score, wherein the match score is calculated based on a distance between a neighborhood of a transaction of the plurality of transactions and a neighborhood of an interaction of the plurality of interactions; and matching, with at least one processor, at least one transaction signature of the plurality of transaction signatures to at least one interaction signature of the plurality of interaction signatures based on the match score.

Clause 8: A system, comprising: at least one processor; and at least one non-transitory computer readable medium including one or more instructions that, when executed by the at least one processor, cause the at least one processor to: generate a plurality of regions within a geographic area, each region of the plurality of regions associated with a region identifier; receive transaction data associated with a plurality of transactions conducted between a plurality of accounts and a plurality of merchants using a plurality of account identifiers, the transaction data comprising, for each transaction, an account identifier and a transaction location; receive mobile application data associated with a plurality of interactions between a plurality of mobile device users and at least one mobile application using a plurality of user identifiers, the mobile application data comprising, for each interaction, a user identifier and an interaction location; determine a region of the plurality of regions for each transaction of the plurality of transactions based on the transaction location; determine a region of the plurality of regions for each interaction of the plurality of interactions based on the interaction location; generate a transaction signature for each account identifier of the plurality of account identifiers based on the region for each transaction of the plurality of transactions initiated with the account identifier, resulting in a plurality of transaction signatures; generate an interaction signature for each user identifier of the plurality of user identifiers based on the region for each interaction of the plurality of interactions associated with a corresponding user identifier, resulting in a plurality of interaction signatures; match at least one transaction signature of the plurality of transaction signatures to at least one interaction signature of the plurality of interaction signatures; and link at least one account identifier of the plurality of account identifiers to at least one user identifier of the plurality of user identifiers based on matching the at least one transaction signature to the at least one interaction signature.

Clause 9: The system of clause 8, wherein the one or more instructions further cause the at least one processor to: generate a plurality of new regions within the geographic area if at least two account identifiers of the plurality of account identifiers are linked to one user identifier of the plurality of user identifiers, wherein at least two new regions of the plurality of new regions overlap with a region for at least one transaction initiated with at least one linked account identifier; determine a new region of the plurality of new regions for each transaction of the plurality of transactions associated with the at least two linked account identifiers based on the transaction location, wherein at least two transactions of the plurality of transactions associated with the at least two linked account identifiers located in the same region are located in different new regions; determine a new region of the plurality of new regions for each interaction of the plurality of interactions associated with the linked user identifier based on the interaction location; generate a new transaction signature for each linked account identifier based on the new region for each transaction of the plurality of transactions associated with the at least two linked account identifiers, resulting in a plurality of new transaction signatures; generate a new interaction signature for the linked user identifier based on the new region for each interaction of the plurality of interactions associated with the linked user identifier, resulting in a new interaction signature; match one new transaction signature of the plurality of new transaction signatures to the new interaction signature; and link one account identifier of the plurality of account identifiers to one user identifier of the plurality of user identifiers based on matching the one new transaction signature to the new interaction signature.

Clause 10: The system of clauses 8 or 9, wherein the one or more instructions further cause the at least one processor to: generate a plurality of new regions within the geographic area if one account identifier of the plurality of account identifiers is linked to at least two user identifiers of the plurality of user identifiers, wherein at least two new regions of the plurality of new regions overlap with a region for at least one interaction initiated with at least one linked user identifier; determine a new region of the plurality of new regions for each interaction of the plurality of interactions associated with the at least two linked user identifiers based on the interaction location wherein at least two interactions of the plurality of interactions associated with the at least two linked user identifiers that are located in the same region are located in different new regions; determine a new region of the plurality of new regions for each transaction of the plurality of transactions associated with the linked account identifier based on the transaction location; generate a new transaction signature for the linked account identifier based on the new region for each transaction of the plurality of transactions associated with the linked account identifier, resulting in a new transaction signature; generate a new interaction signature for each linked user identifier based on the new region for each interaction of the plurality of interactions associated with the at least two linked user identifiers, resulting in a plurality of new interaction signatures; match the new transaction signature to one new interaction signature of the plurality of new interaction signatures; and link one account identifier of the plurality of account identifiers to one user identifier of the plurality of user identifiers based on matching the new transaction signature to the at least one new interaction signature.

Clause 11: The system of any of clauses 8-10, wherein the transaction data associated with the plurality of transactions comprises a transaction time and/or the mobile application data associated with the plurality of interactions comprises a time of interaction; and wherein generating the transaction signature for each account identifier of the plurality of account identifiers data is further based on the transaction time or generating the interaction signature for each user identifier of the plurality of user identifiers is further based on the time of interaction.

Clause 12: The system of any of clauses 8-11, wherein matching at least one transaction signature of the plurality of transaction signatures to at least one interaction signature of the plurality of interaction signatures is based on a difference between the transaction time and the time of interaction satisfying a predetermined threshold.

Clause 13: The system of any of clauses 8-12, at least two account identifiers are linked to one user identifier and/or at least two user identifiers are linked to one account identifier, the one or more instructions further cause the at least one processor to: shorten the predetermined threshold; match at least one transaction signature of the plurality of transaction signatures to at least one interaction signature of the plurality of interaction signatures; and link at least one account identifier of the plurality of account identifiers to at least one user identifier of the plurality of user identifiers based on matching the at least one transaction signature to the at least one interaction signature.

Clause 14: The system of any of clauses 8-13, wherein the one or more instructions further cause the at least one processor to: generate a plurality of neighborhoods, wherein each neighborhood of the plurality of neighborhoods encompasses a center region and all regions adjacent to the center region; determine a neighborhood of the plurality of neighborhoods for each transaction of the plurality of transactions based on the transaction location; determine a neighborhood of the plurality of neighborhoods for each interaction of the plurality of interactions based on the interaction location; generate a match score, wherein the match score is calculated based on a distance between a neighborhood of a transaction of the plurality of transactions and a neighborhood of an interaction of the plurality of interactions; and match at least one transaction signature of the plurality of transaction signatures to at least one interaction signature of the plurality of interaction signatures based on the match score.

Clause 15: A computer program product comprising at least one non-transitory computer-readable medium including one or more instructions that, when executed by at least one processor, cause the at least one processor to: generate a plurality of regions within a geographic area, each region of the plurality of regions associated with a region identifier; receive transaction data associated with a plurality of transactions conducted between a plurality of accounts and a plurality of merchants using a plurality of account identifiers, the transaction data comprising, for each transaction, an account identifier and a transaction location; receive mobile application data associated with a plurality of interactions between a plurality of mobile device users and at least one mobile application using a plurality of user identifiers, the mobile application data comprising, for each interaction, a user identifier and an interaction location; determine a region of the plurality of regions for each transaction of the plurality of transactions based on the transaction location; determine a region of the plurality of regions for each interaction of the plurality of interactions based on the interaction location; generate a transaction signature for each account identifier of the plurality of account identifiers based on the region for each transaction of the plurality of transactions initiated with the account identifier, resulting in a plurality of transaction signatures; generate an interaction signature for each user identifier of the plurality of user identifiers based on the region for each interaction of the plurality of interactions associated with a corresponding user identifier, resulting in a plurality of interaction signatures; match at least one transaction signature of the plurality of transaction signatures to at least one interaction signature of the plurality of interaction signatures; and link at least one account identifier of the plurality of account identifiers to at least one user identifier of the plurality of user identifiers based on matching the at least one transaction signature to the at least one interaction signature.

Clause 16: The computer program product of clause 15, wherein the one or more instructions further cause the at least one processor to: generate a plurality of new regions within the geographic area if at least two account identifiers of the plurality of account identifiers are linked to one user identifier of the plurality of user identifiers, wherein at least two new regions of the plurality of new regions overlap with a region for at least one transaction initiated with at least one linked account identifier; determine a new region of the plurality of new regions for each transaction of the plurality of transactions associated with the at least two linked account identifiers based on the transaction location, wherein at least two transactions of the plurality of transactions associated with the at least two linked account identifiers located in the same region are located in different new regions; determine a new region of the plurality of new regions for each interaction of the plurality of interactions associated with the linked user identifier based on the interaction location; generate a new transaction signature for each linked account identifier based on the new region for each transaction of the plurality of transactions associated with the at least two linked account identifiers, resulting in a plurality of new transaction signatures; generate a new interaction signature for the linked user identifier based on the new region for each interaction of the plurality of interactions associated with the linked user identifier, resulting in a new interaction signature; match one new transaction signature of the plurality of new transaction signatures to the new interaction signature; and link one account identifier of the plurality of account identifiers to one user identifier of the plurality of user identifiers based on matching the one new transaction signature to the new interaction signature.

Clause 17: The computer program product of clauses 15 or 16, wherein the one or more instructions further cause the at least one processor to: generate a plurality of new regions within the geographic area if one account identifier of the plurality of account identifiers is linked to at least two user identifiers of the plurality of user identifiers, wherein at least two new regions of the plurality of new regions overlap with a region for at least one interaction initiated with at least one linked user identifier; determine a new region of the plurality of new regions for each interaction of the plurality of interactions associated with the at least two linked user identifiers based on the interaction location wherein at least two interactions of the plurality of interactions associated with the at least two linked user identifiers that are located in the same region are located in different new regions; determine a new region of the plurality of new regions for each transaction of the plurality of transactions associated with the linked account identifier based on the transaction location; generate a new transaction signature for the linked account identifier based on the new region for each transaction of the plurality of transactions associated with the linked account identifier, resulting in a new transaction signature; generate a new interaction signature for each linked user identifier based on the new region for each interaction of the plurality of interactions associated with the at least two linked user identifiers, resulting in a plurality of new interaction signatures; match the new transaction signature to one new interaction signature of the plurality of new interaction signatures; and link one account identifier of the plurality of account identifiers to one user identifier of the plurality of user identifiers based on matching the new transaction signature to the at least one new interaction signature.

Clause 18: The computer program product of any of clauses 15-17, wherein the transaction data associated with the plurality of transactions comprises a transaction time and/or the mobile application data associated with the plurality of interactions comprises a time of interaction; and wherein generating the transaction signature for each account identifier of the plurality of account identifiers data is further based on the transaction time or generating the interaction signature for each user identifier of the plurality of user identifiers is further based on the time of interaction.

Clause 19: The computer program product of any of clauses 15-18, wherein matching at least one transaction signature of the plurality of transaction signatures to at least one interaction signature of the plurality of interaction signatures is based on a difference between the transaction time and the time of interaction satisfying a predetermined threshold.

Clause 20: The computer program product of any of clauses 15-19, wherein the one or more instructions further cause the at least one processor to: generate a plurality of neighborhoods, wherein each neighborhood of the plurality of neighborhoods encompasses a center region and all regions adjacent to the center region; determine a neighborhood of the plurality of neighborhoods for each transaction of the plurality of transactions based on the transaction location; determine a neighborhood of the plurality of neighborhoods for each interaction of the plurality of interactions based on the interaction location; generate a match score, wherein the match score is calculated based on a distance between a neighborhood of a transaction of the plurality of transactions and a neighborhood of an interaction of the plurality of interactions; and match at least one transaction signature of the plurality of transaction signatures to at least one interaction signature of the plurality of interaction signatures based on the match score.

Clause 21: A computer-implemented method, comprising: generating, with at least one processor, a plurality of regions within a geographic area, each region of the plurality of regions associated with a region identifier; processing, with at least one processor, transaction data associated with a plurality of transactions conducted between a plurality of accounts and a plurality of merchants to determine, for each transaction, a region of the plurality of regions in which the transaction occurred; processing, with at least one processor, mobile application data associated with a plurality of interactions between a plurality of mobile device users and at least one mobile application to determine, for each interaction, a region of the plurality of regions in which the interaction occurred; generating, with at least one processor, a transaction signature for each account identifier of the plurality of account identifiers based on the region of each transaction initiated with the account identifier, resulting in a plurality of transaction signatures; generating, with at least one processor, an interaction signature for each user identifier of the plurality of user identifiers based on the region of each interaction associated with a corresponding user identifier, resulting in a plurality of interaction signatures; matching, with at least one processor, at least one transaction signature of the plurality of transaction signatures to at least one interaction signature of the plurality of interaction signatures; and linking, with at least one processor, at least one account identifier of the plurality of account identifiers to at least one user identifier of the plurality of user identifiers based on matching the at least one transaction signature to the at least one interaction signature.

Clause 22: A system, comprising: at least one processor; and at least one non-transitory computer readable medium including one or more instructions that, when executed by the at least one processor, cause the at least one processor to: generate, with at least one processor, a plurality of regions within a geographic area, each region of the plurality of regions associated with a region identifier; process, with at least one processor, transaction data associated with a plurality of transactions conducted between a plurality of accounts and a plurality of merchants to determine, for each transaction, a region of the plurality of regions in which the transaction occurred; process, with at least one processor, mobile application data associated with a plurality of interactions between a plurality of mobile device users and at least one mobile application to determine, for each interaction, a region of the plurality of regions in which the interaction occurred; generate, with at least one processor, a transaction signature for each account identifier of the plurality of account identifiers based on the region of each transaction initiated with the account identifier, resulting in a plurality of transaction signatures; generate, with at least one processor, an interaction signature for each user identifier of the plurality of user identifiers based on the region of each interaction associated with a corresponding user identifier, resulting in a plurality of interaction signatures; match, with at least one processor, at least one transaction signature of the plurality of transaction signatures to at least one interaction signature of the plurality of interaction signatures; and link, with at least one processor, at least one account identifier of the plurality of account identifiers to at least one user identifier of the plurality of user identifiers based on matching the at least one transaction signature to the at least one interaction signature.

Clause 23: A computer program product comprising at least one non-transitory computer-readable medium including one or more instructions that, when executed by at least one processor, cause the at least one processor to: generate, with at least one processor, a plurality of regions within a geographic area, each region of the plurality of regions associated with a region identifier; process, with at least one processor, transaction data associated with a plurality of transactions conducted between a plurality of accounts and a plurality of merchants to determine, for each transaction, a region of the plurality of regions in which the transaction occurred; process, with at least one processor, mobile application data associated with a plurality of interactions between a plurality of mobile device users and at least one mobile application to determine, for each interaction, a region of the plurality of regions in which the interaction occurred; generate, with at least one processor, a transaction signature for each account identifier of the plurality of account identifiers based on the region of each transaction initiated with the account identifier, resulting in a plurality of transaction signatures; generate, with at least one processor, an interaction signature for each user identifier of the plurality of user identifiers based on the region of each interaction associated with a corresponding user identifier, resulting in a plurality of interaction signatures; match, with at least one processor, at least one transaction signature of the plurality of transaction signatures to at least one interaction signature of the plurality of interaction signatures; and link, with at least one processor, at least one account identifier of the plurality of account identifiers to at least one user identifier of the plurality of user identifiers based on matching the at least one transaction signature to the at least one interaction signature.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter. As used in the specification and the claims, the singular form of "a," "an," and "the" include plural referents unless the context clearly dictates otherwise.

BRIEF DESCRIPTION OF THE DRAWINGS

Additional advantages and details of the disclosed subject matter are explained in greater detail below with reference to the exemplary embodiments or aspects that are illustrated in the accompanying figures, in which.

DESCRIPTION

Figure 1:
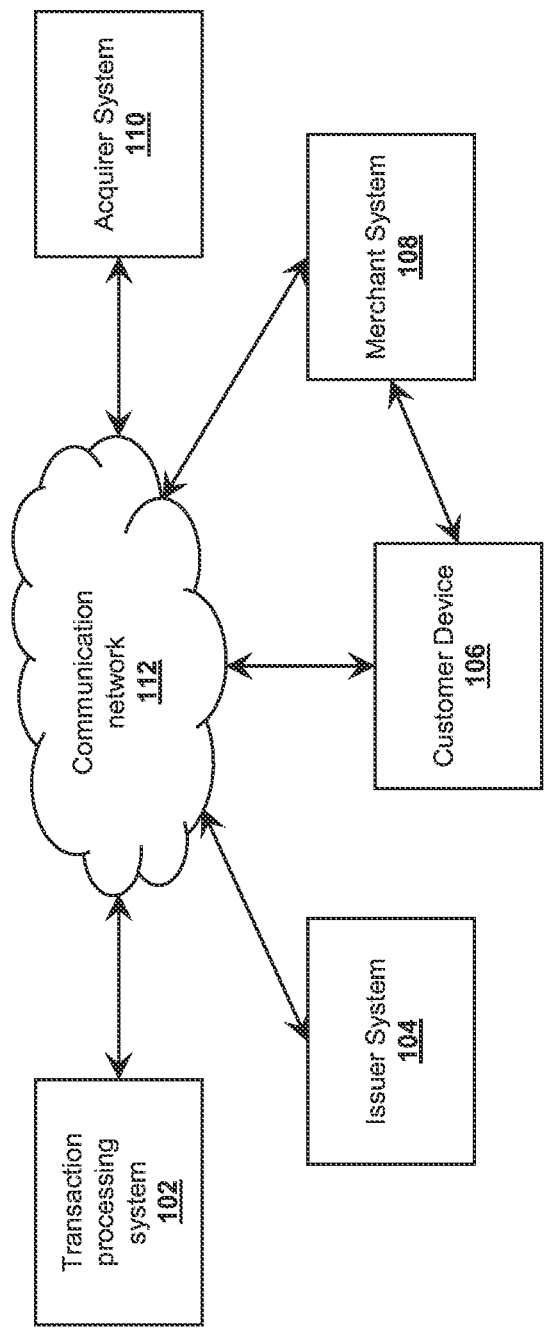
FIG. 1 is a diagram of a non-limiting embodiment or aspect of an environment in which methods, systems, and/or computer program products, described herein, may be implemented according to the principles of the presently disclosed subject matter.

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the terms "issuer institution," "portable financial device issuer," "issuer," or "issuer bank" may refer to one or more entities that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a portable financial device, such as a physical financial instrument, e.g., a payment card, and/or may be electronic and used for electronic payments. The terms "issuer institution" and "issuer institution system" may also refer to one or more computer systems operated by or on behalf of an issuer institution, such as a server computer executing one or more software applications. For example, an issuer institution system may include one or more authorization servers for authorizing a transaction.

As used herein, the term "account identifier" may include one or more types of identifiers associated with a user account (e.g., a PAN, a card number, a payment card number, a payment token, and/or the like). In some non-limiting embodiments or aspects, an issuer institution may provide an account identifier (e.g., a PAN, a payment token, and/or the like) to a user that uniquely identifies one or more accounts associated with that user. The account identifier may be embodied on a physical financial instrument (e.g., a portable financial instrument, a payment card, a credit card, a debit card, and/or the like) and/or may be electronic information communicated to the user that the user may use for electronic payments. In some non-limiting embodiments or aspects, the account identifier may be an original account identifier, where the original account identifier was provided to a user at the creation of the account associated with the account identifier. In some non-limiting embodiments or aspects, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In some non-limiting embodiments or aspects, an account identifier may be directly or indirectly associated with an issuer institution such that an account identifier may be a payment token that maps to a PAN or other type of identifier. Account identifiers may be alphanumeric, any combination of characters and/or symbols, and/or the like. An issuer institution may be associated with a bank identification number (BIN) that uniquely identifies the issuer institution.

As used herein, the term "merchant" may refer to one or more entities (e.g., operators of retail businesses that provide goods and/or services, and/or access to goods and/or services, to a user (e.g., a customer, a consumer, a customer of the merchant, and/or the like) based on a transaction (e.g., a payment transaction)). As used herein, the term "merchant system" may refer to one or more computer systems operated by or on behalf of a merchant, such as a server computer executing one or more software applications. As used herein, the term "product" may refer to one or more goods and/or services offered by a merchant.

As used herein, the term "point-of-sale (POS) device" may refer to one or more devices, which may be used by a merchant to initiate transactions (e.g., a payment transaction), engage in transactions, and/or process transactions. For example, a POS device may include one or more computers, peripheral devices, card readers, near-field communication (NFC) receivers, radio frequency identification (RFID) receivers, and/or other contactless transceivers or receivers, contact-based receivers, payment terminals, computers, servers, input devices, and/or the like.

As used herein, the term "point-of-sale (POS) system" may refer to one or more computers and/or peripheral devices used by a merchant to conduct a transaction. For example, a POS system may include one or more POS devices and/or other like devices that may be used to conduct a payment transaction. A POS system (e.g., a merchant POS system) may also include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and the issuer institution. In some non-limiting embodiments or aspects, a transaction service provider may include a credit card company, a debit card company, and/or the like. As used herein, the term "transaction processing system" may refer to one or more computer systems operated by or on behalf of a transaction service provider, such as a transaction processing server executing one or more software applications. A transaction processing system may include one or more processors and, in some non-limiting embodiments or aspects, may be operated by or on behalf of a transaction service provider.

As used herein, the term "acquirer" may refer to an entity licensed by the transaction service provider and approved by the transaction service provider to originate transactions (e.g., payment transactions) using a portable financial device associated with the transaction service provider. As used herein, the term "acquirer system" may also refer to one or more computer systems, computer devices, and/or the like operated by or on behalf of an acquirer. The transactions may include payment transactions (e.g., purchases, original credit transactions (OCTs), account funding transactions (AFTs), and/or the like). In some non-limiting embodiments or aspects, the acquirer may be authorized by the transaction service provider to assign merchant or service providers to originate transactions using a portable financial device of the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure that proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by an acquirer's payment facilitators, and/or the like. In some non-limiting embodiments or aspects, an acquirer may be a financial institution, such as a bank.

As used herein, the terms "electronic wallet," "electronic wallet mobile application," and "digital wallet" may refer to one or more electronic devices and/or one or more software applications configured to initiate and/or conduct transactions (e.g., payment transactions, electronic payment transactions, and/or the like). For example, an electronic wallet may include a user device (e.g., a mobile device) executing an application program and server-side software and/or databases for maintaining and providing transaction data to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, Google Pay®, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the term "portable financial device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet mobile application, a PDA, a pager, a security card, a computer, an access card, a wireless terminal, a transponder, and/or the like. In some non-limiting embodiments or aspects, the portable financial device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway and/or to a payment gateway itself. As used herein, the term "payment gateway mobile application" may refer to one or more electronic devices and/or one or more software applications configured to provide payment services for transactions (e.g., payment transactions, electronic payment transactions, and/or the like).

As used herein, the terms "client" and "client device" may refer to one or more client-side computing devices (e.g., remote from a transaction processing system) used to initiate or facilitate a transaction (e.g., a payment transaction). As an example, a "client device" may refer to one or more POS devices used by a merchant, one or more acquirer host computers used by an acquirer, one or more mobile devices used by a user, and/or the like. In some non-limiting embodiments or aspects, a client device may be an electronic device configured to communicate with one or more networks and initiate or facilitate transactions.

As used herein, the term "server" may refer to one or more computing devices (e.g., processors, storage devices, similar computer components, and/or the like) that communicate with client devices and/or other computing devices over a network (e.g., a public network, the Internet, a private network, and/or the like) and, in some examples, facilitate communication among other servers and/or client devices. It will be appreciated that various other arrangements are possible. As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

Non-limiting embodiments or aspects of the disclosed subject matter are directed to systems, methods, and computer program products for matching user data from one system to user data from a second system data, including, but not limited to, matching card transaction data to mobile application data.

For the purpose of illustration, in the following description, while the presently disclosed subject matter is described with respect to methods, systems, and computer program products for matching card transaction data to mobile application data, one skilled in the art will recognize that the disclosed subject matter is not limited to the illustrative embodiments or aspects. For example, the methods, systems, and computer program products described herein may be used with a wide variety of settings, such as user data from one database with known users to user information from another database with unknown users wherein each database provides location information for particular events, such as transaction or interactions.

It has been difficult to identify a mobile phone user based on the mobile application data of their user device, such as what mobile applications they use, when they use it, and where they use it. The present disclosure provides a system, method, and computer program product that allows for an entity to match an identity from an account identifier to an identity from a mobile user identifier based on transaction data and mobile application data by comparing the locations of account transactions to the locations of interactions with one or more mobile applications. The current disclosure allows for an entity to gain additional information about a user from other sources that keep the identities of their users anonymous. This allows the entity to provide better service to a customer or client by identifying customer preferences by identifying activities and interests of the customer from outside sources. The systems and methods disclosed herein also allow for decreased computational resource usage. A finer mesh of regions results in increased computational resources to generate the regions and identify which regions used in the disclosed methodology are associated with each transaction and interaction. By starting with a less fine mesh, and creating finer meshes as needed, less computational resources are utilized when generating the mesh of regions. Additionally, too fine of a mesh may result in less confident matches as a user will often move locations between making a transaction and making an interaction. Therefore, an interaction and a transaction are less likely to be located in the same region if the regions are too small. Non-limiting embodiments described herein allow for increased accuracy and confidence when matching a user to an account by either altering the geographic region size or by altering a timing threshold difference between the transaction time and the time of the interaction.

Referring now to FIG. 1, FIG. 1 is a diagram of a non-limiting embodiment or aspect of a system 100. As shown in FIG. 1, the system 100 includes transaction processing system 102, issuer system 104, customer device 106, merchant system 108, acquirer system 110, and communication network 112.

Transaction processing system 102 may include one or more computing devices capable of receiving information from and/or communicating information to issuer system 104, customer device 106, merchant system 108, and/or acquirer system 110 via network 112. For example, transaction processing system 102 may include a server (e.g., a transaction processing server), a group of servers, and/or other like devices. In some non-limiting embodiments or aspects, transaction processing system 102 may be associated with a transaction service provider as described herein. In some non-limiting embodiments or aspects, transaction processing system 102 may be in communication with a data storage device, which may be local or remote to transaction processing system 102. In some non-limiting embodiments or aspects, transaction processing system 102 may be capable of receiving information from, storing information in, communicating information to, or searching information stored in the data storage device.

Issuer system 104 may include one or more computing devices capable of receiving information and/or communicating information to transaction processing system 102, customer device 106, merchant system 108, and/or acquirer system 110 via network 112. For example, issuer system 104 may include a server, a group of servers, and/or other like devices. In some non-limiting embodiments or aspects, issuer system 104 may be associated with an issuer institution as described herein. For example, issuer system 104 may be associated with an issuer institution that issued a credit account, debit account, credit card, debit card, and/or the like to a user associated with customer device 106.

Customer device 106 may include one or more computing devices capable of receiving information from and/or communicating information to transaction processing system 102, issuer system 104, merchant system 108, and/or acquirer system 110 via network 112. For example, customer device 106 may include a client device and/or the like. In some non-limiting embodiments or aspects, customer device 106 may be capable of receiving information (e.g., from merchant system 108 or from another customer device 106)

via a short-range wireless communication connection (e.g., an NFC communication connection, an RFID communication connection, a Bluetooth® communication connection, a Zigbee® communication connection, and/or the like), and/or communicating information (e.g., to merchant system 108) via a short-range wireless communication connection.

Merchant system 108 may include one or more computing devices capable of receiving information from and/or communicating information to transaction processing system 102, issuer system 104, customer device 106, and/or acquirer system 110 via network 112. Merchant system 108 may also include a device capable of receiving information from customer device 106 via network 112, a communication connection (e.g., an NFC communication connection, an RFID communication connection, a Bluetooth® communication connection, a Zigbee® communication connection, and/or the like) with customer device 106, and/or the like, and/or communicating information to customer device 106 via network 112, the communication connection, and/or the like. In some non-limiting embodiments or aspects, merchant system 108 may include a server, a group of servers, a client device, a group of client devices, and/or other like devices. In some non-limiting embodiments or aspects, merchant system 108 may be associated with a merchant as described herein. In some non-limiting embodiments or aspects, merchant system 108 may include one or more client devices. For example, merchant system 108 may include a client device that allows a merchant to communicate information to transaction processing system 102. In some non-limiting embodiments or aspects, merchant system 108 may include one or more devices, such as computers, computer systems, and/or peripheral devices capable of being used by a merchant to conduct a transaction with a user. For example, merchant system 108 may include a POS device and/or a POS system.

Acquirer system 110 may include one or more computing devices capable of receiving information from and/or communicating information to transaction processing system 102, issuer system 104, customer device 106, and/or merchant system 108 via network 112. For example, acquirer system 110 may include a server, a group of servers, and/or the like. In some non-limiting embodiments or aspects, acquirer system 110 may be associated with an acquirer as described herein.

Network 112 may include one or more wired and/or wireless networks. For example, network 112 may include a cellular network (e.g., a long-term evolution (LTE) network, a third generation (3G) network, a fourth generation (4G) network, a fifth generation (5G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

With continued reference to FIG. 1, a customer device 106 may communicate mobile application data to a transaction processing system 102. The customer device 106 may communicate the mobile application data to the transaction processing system 102 through a third party or network 112.

With continued reference to FIG. 1, a merchant system 108 may communicate transaction data to the transaction processing system 102 through the communication network 112. The merchant system 108 may communicate the transaction data to the transaction processing system 102 through a third party. In some non-limiting embodiments or aspects, the transaction data may be communicated to the transaction processing system 102 by an issuer system 104 or an acquirer system 110.

With continued reference to FIG. 1, in some non-limiting embodiments or aspects, the transaction data and mobile application data may be communicated to an issuer system 104 and/or an acquirer system 110. In some non-limiting embodiments or aspects, the customer device 106 may communicate a transaction to the merchant system 108.

With continued reference to FIG. 1, the transaction processing system 102 may generate a set of geographic regions and each transaction associated with the transaction data and each mobile application interaction associated with the mobile application data may be assigned to a specific geographic region. The transaction processing system 102 may generate a transaction signature for each account identifier associated with the transaction data based on the regions associated with the transactions associated with the account identifier. The transaction processing system 102 may also generate an interaction signature for each user identifier associated with the mobile application data based on the regions associated with the mobile application interactions associated with user identifier. In some non-limiting embodiments or aspects, the issuer system or the acquirer system may generate the geographic regions, transaction signatures, and/or interaction signatures.

With continued reference to FIG. 1, the transaction processing system 102 may match a transaction signature to an interaction signature based on the regions associated with the transaction signature and the interaction signature. Transaction processing system 102 may then link an account identifier to a user identifier based on the matched transaction signature associated with the account identifier and interaction signature associated with the user identifier. In some non-limiting embodiments or aspects, the issuer system 104 and/or the acquirer system 110 may match the transaction signature and interaction signature and may link the account identifier to the user identifier.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally or alternatively, a set of systems (e.g., one or more systems) or a set of devices (e.g., one or more devices) of system 100 may perform one or more functions described as being performed by another set of systems or another set of devices of system 100.

Figure 2:
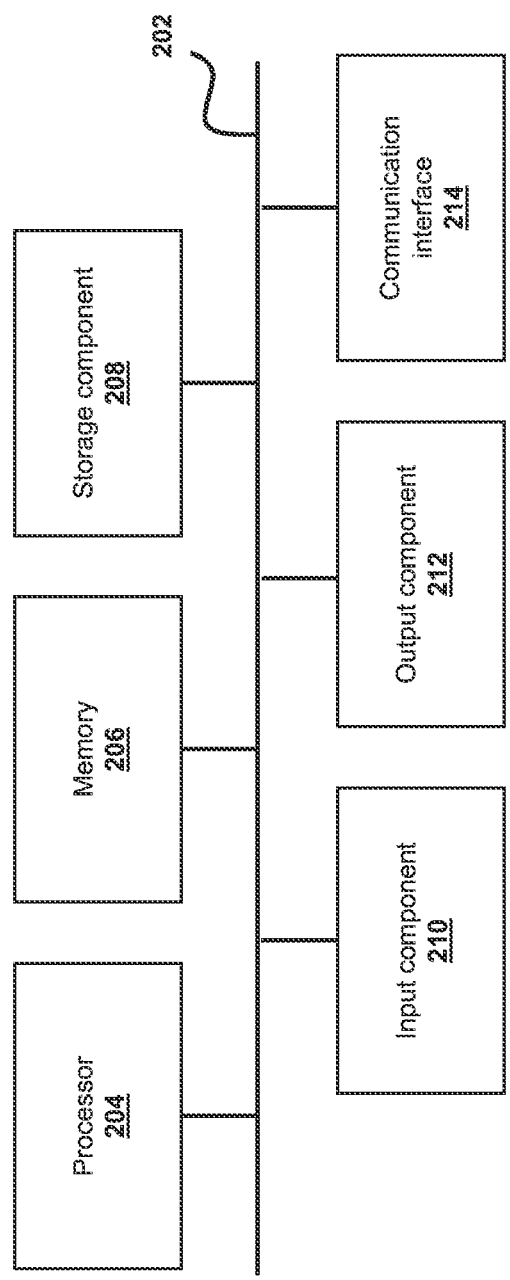
FIG. 2 is a diagram of a non-limiting embodiment or aspects of components of one or more devices of FIG. 1.

Referring now to FIG. 2, FIG. 2 is a diagram of example components of a device 200. Device 200 may correspond to one or more devices of transaction processing system 102, one or more devices of issuer system 104, customer device 106, one or more devices of merchant system 108, and/or one or more devices of acquirer system 110. In some non-limiting embodiments or aspects, transaction processing system 102, issuer system 104, customer device 106, merchant system 108, and/or acquirer system 110 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, software, firmware, and/or any combination thereof. For example, processor 204 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like), and/or the like, which can be programmed to perform a function. Memory 206 may include random access memory (RAM), read-only memory (ROM), and/or another type of dynamic or static storage device (e.g., flash memory, magnetic memory, optical memory, and/or the like) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, a camera, and/or the like). Additionally or alternatively, input component 210 may include a sensor for sensing information (e.g., a global positioning system (GPS) component, an accelerometer, a gyroscope, an actuator, and/or the like). Output component 212 may include a component that provides output information from device 200 (e.g., a display, a speaker, one or more light-emitting diodes (LEDs), and/or the like).

Communication interface 214 may include a transceiver-like component (e.g., a transceiver, a receiver and transmitter that are separate, and/or the like) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a Bluetooth® interface, a Zigbee® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
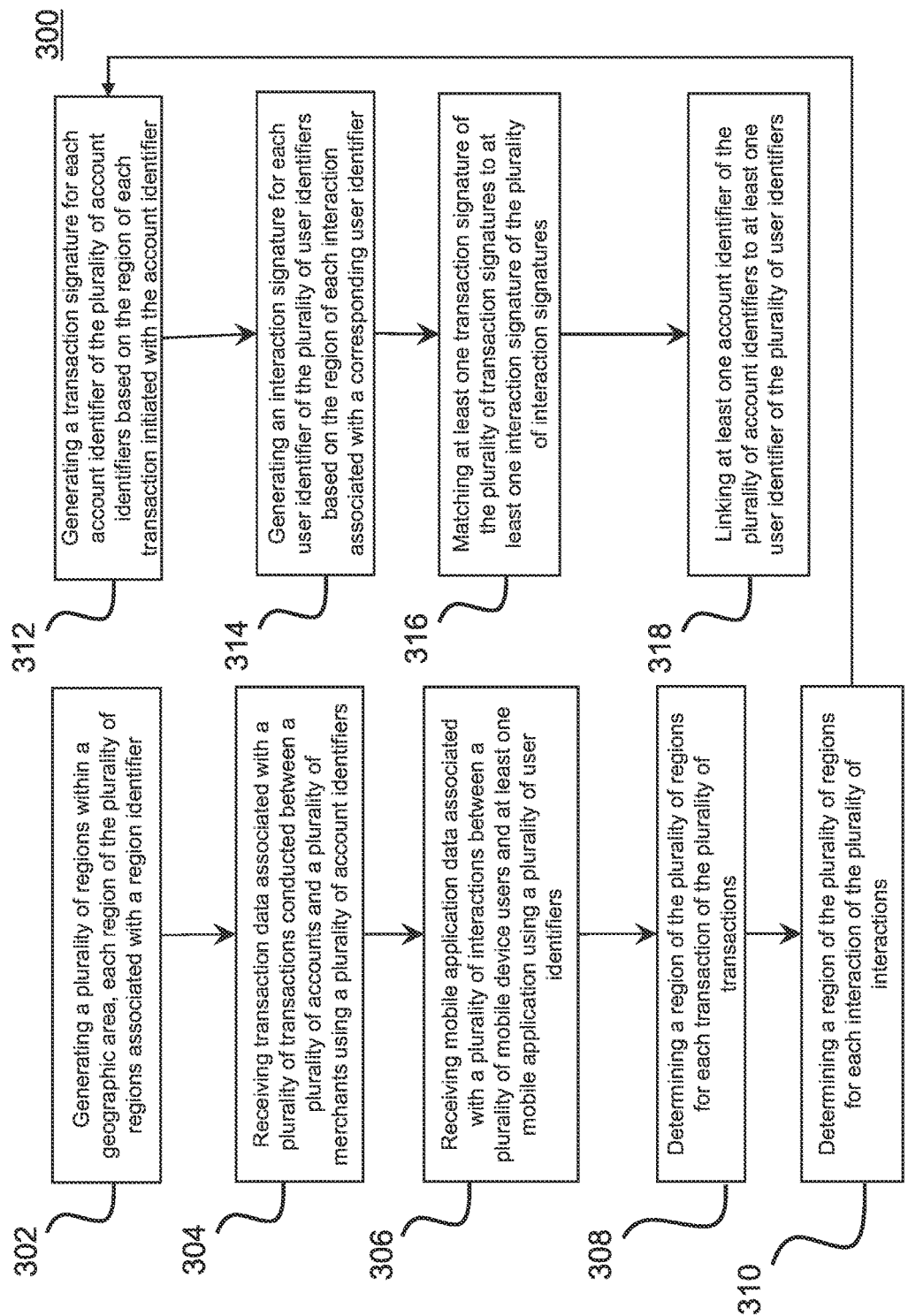
FIG. 3 is a flowchart of a non-limiting embodiment or aspect of a process for matching card transaction data to mobile application data according to the principles of the presently disclosed subject matter.

Referring now to FIG. 3, FIG. 3 is a flowchart of a non-limiting embodiment or aspect of a process 300 for matching transaction data with mobile application data. In some non-limiting embodiments or aspects, one or more of the steps of process 300 may be performed (e.g., completely, partially, and/or the like) by a transaction processing system. In some non-limiting embodiments or aspects, one or more of the steps of process 300 may be performed (e.g., completely, partially, and/or the like) by another system, another device, another group of systems, or another group of devices, separate from or including merchant systems, acquirer systems, and/or issuer systems.

As shown in FIG. 3, at step 302, process 300 may include generating a plurality of regions within a geographic area. The regions and/or geographic area may defined by geographic coordinates, streets, city blocks, zip codes, cities, states, provinces, countries, addresses, radius and/or distance from an address and/or geographic coordinate, artificial boundaries, and/or the like. In some non-limiting embodiments or aspects, the size of the regions may be predetermined and may be based on computational time to generate the regions. In some non-limiting embodiments, the size of the regions may be determined by a machine learning algorithm. For example, the machine learning algorithm may determine the sizes of regions based on the sizes of previous regions that resulted in linking user identifiers to account identifiers (e.g., linking a single user identifier to a single account identifier) based on previously analyzed transaction data and mobile application data. Each region may be associated with a unique region identifier. The region identifier may be a numerical value, alphabetical value, and/or an alphanumerical value.

In some non-limiting embodiments or aspects, the number of regions within the geographic area may be predetermined. In some non-limiting embodiments or aspects, the size of the regions may be determined based on land area, population, number of merchants, and/or the like. In some non-limiting embodiments or aspects, the regions may be defined by a polygon defined by a convex hull algorithm. The regions may be defined such that the regions do not overlap with each other. A region may share at least a portion of its boundary line with another region.

In some non-limiting embodiments or aspects, each neighborhood may be associated with a unique neighborhood identifier. A neighborhood may include the geographic area(s) enclosed by a specified region (e.g., a center region) and all regions adjacent to the specified region. Adjacent regions may include regions which share at least a portion of the boundary line of the specified region. A neighborhood may be defined for more than one region, or may be defined for every region, wherein each region is the specified region for its own associated neighborhood. More than one neighborhood may overlap with another neighborhood. A region may be included in more than one neighborhood such that it is the specified region in one neighborhood and may be an adjacent region in one or more neighborhoods.

Figure 5:
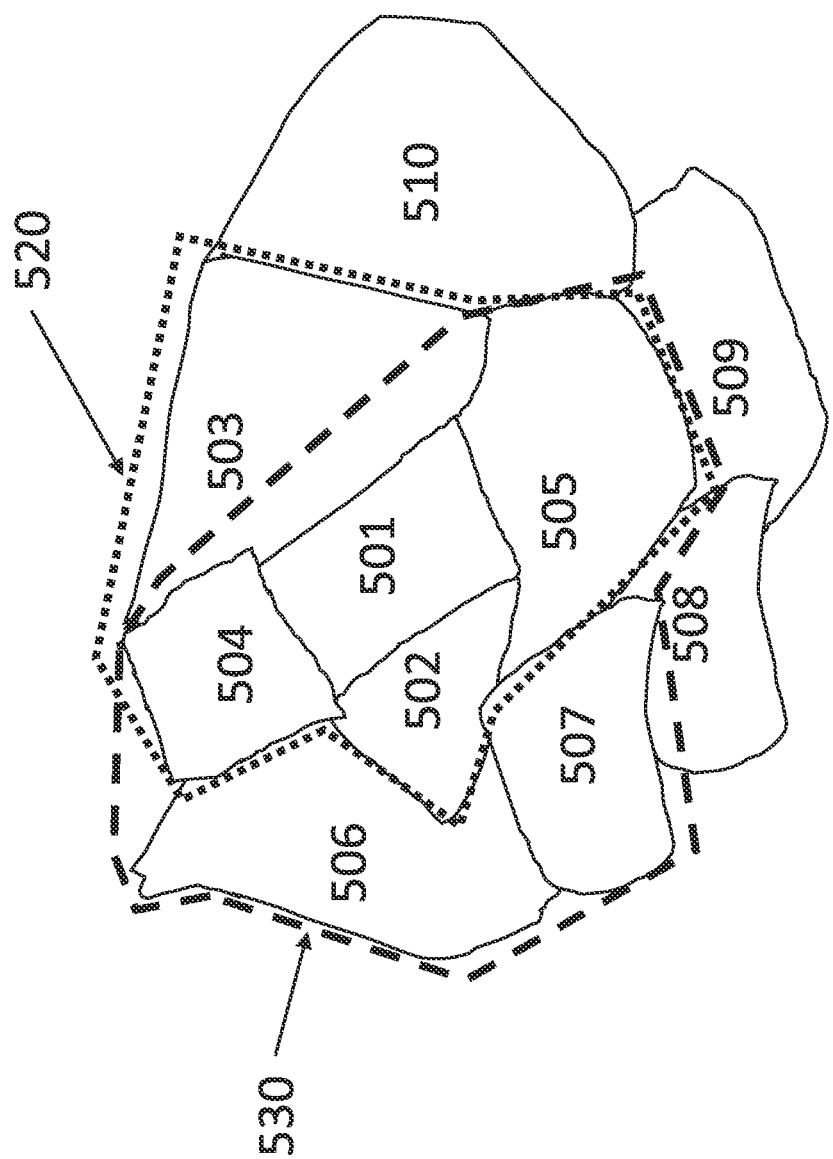
FIG. 5 is a diagram of a non-limiting embodiment or aspect of an implementation of neighborhoods.

FIG. 5 shows an example of neighborhoods according to some non-limiting embodiments or aspects. In this example, the first neighborhood 520 is associated with center region 501, and the second neighborhood 530 is associated with center region 502. The first neighborhood's center region 501 is adjacent to regions 502, 503, 504, and 505. Therefore, the first neighborhood 520 may be determined to be associated with the geographic areas enclosed by regions 501, 502, 503, 504, and 505. The second neighborhood's center region 502 is adjacent to neighborhoods 501, 504, 505, 506, and 507. Therefore, the second neighborhood 530 may be determined to be associated with the geographic areas enclosed by regions 501, 502, 504, 505, 506, and 507. In this example, regions 501, 502, 504, and 505 are included in both the first neighborhood 520 and the second neighborhood 530. In this example, regions 508, 509, and 510 are not adjacent to either 501 or 502, and thus are not included in the first neighborhood 520 or the second neighborhood 530.

Referring back to FIG. 3, at step 304, the process 300 may include receiving transaction data associated with a plurality of transactions conducted between a plurality of accounts and a plurality of merchants using a plurality of account identifiers. The transaction data may include, for example, an account identifier and a transaction location for each transaction. The transaction location may include the merchant name and/or identifier, merchant category, and/or a geographic location, such as an address, a zip code, geographic coordinates, and/or the like. The transaction data may also include the date and/or time of transaction.

In some non-limiting embodiments or aspects, the transaction data received may be from a predetermined period of time. For example, the transaction data may be for transactions initiated on a particular day, or from a range of dates and/or times. The transaction data may be for transactions initiated within a particular range of hours, for example.

With continued reference to FIG. 3, at step 306, process 300 may include receiving mobile application data associated with at least one interaction between at least one mobile device user and at least one mobile application using a plurality of user identifiers (e.g., interaction data). The mobile application data may include a user identifier, connection type (e.g., WiFi®, mobile data, and/or the like), type of mobile device, and an interaction location for each interaction. The interaction location may include the mobile application name and/or identifier, and/or a geographic location, such as an address, a zip code, geographic coordinates (e.g. latitudinal/longitudinal coordinates and/or the like), and/or the like. The mobile application data may include the date and/or time of interaction.

In some non-limiting embodiments or aspects, the mobile application data received may be from a predetermined period of time. For example, the mobile application data may represent interactions initiated on a particular day or from a range of dates and/or times. The mobile application data may represent interactions initiated within a particular range of hours, for example.

With continued reference to FIG. 3, at step 308, process 300 may include determining a region identifier for each transaction based on the transaction location. In some non-limiting embodiments or aspects, the transaction location may be based on the geographic location of the transaction. In some non-limiting embodiments or aspects, the region may be determined using a GIS tool (e.g., a spatial join operation, a point-in-geometry algorithm, and/or the like). In some non-limiting embodiments or aspects, a neighborhood identifier for each transaction may be determined based on the transaction location.

With continued reference to FIG. 3, at step 310, process 300 may include determining a region identifier for each interaction based on the interaction location. In some non-limiting embodiments or aspects, the interaction location may be based on the geographic location of the interaction. In some non-limiting embodiments or aspects, the region may be determined using a geographic information system (GIS) tool (e.g., a spatial join operation, a point-in-geometry algorithm, and/or the like). In some non-limiting embodiments or aspects, a neighborhood identifier for each interaction may be determined based on the interaction location.

With continued reference to FIG. 3, at step 312, process 300 may include generating a transaction signature for each account identifier based on the region of each transaction initiated with the account identifier. This may result in a plurality of transaction signatures. In some non-limiting embodiments or aspects, the transaction signature may be based on the region identifiers of each region in which a transaction for the account identifier took place. For example, the transaction signature may contain each region identifier associated with the transactions of the account identifier. In some non-limiting embodiments or aspects, the transaction signature may be based on the neighborhood identifier associated with the transaction. In some non-limiting embodiments or aspects, the transaction signature may be based on the transaction time. In some non-limiting embodiments or aspects, a transaction signature may be generated for only account identifiers associated with transactions located within a predetermined minimum number of unique regions (e.g., a transaction signature is only generated if transactions associated with the account identifier are located in at least three different regions).

In some non-limiting embodiments or aspects, more than one transaction signature may be associated with an account identifier. In some non-limiting embodiments or aspects, a transaction signature may be generated based on a predetermined interval of time (e.g., every hour, every day, every week, and/or the like) such that each account identifier is associated with a plurality of transaction signatures including a transaction signature for each interval of time for each interval in a period of time. A longer predetermined interval of time (e.g., several weeks, a month, and/or the like) may result in a larger number of transactions associated with the transaction signature and a larger number of region identifiers and/or neighborhood identifiers associated with the transaction signature. An increased number of associated region identifiers and/or neighborhood identifiers will result in a more unique transaction signature. Therefore, a longer predetermined interval of time may increase the uniqueness of the transaction signature. The transaction signatures may be generated at the end of each predetermined interval of time, for example. In some non-limiting embodiments or aspects, the transaction signatures for several intervals of time may be generated at once, such as when initiated by a user after specifying a number of intervals of time or automatically after a period of time has passed or another triggering event has occurred.

In some non-limiting embodiments or aspects, a home region may be determined based on the transaction signatures. For example, a home region may be determined based on the locations of transactions associated with everyday merchant categories (e.g., grocery stores, gas stations, and/or the like). A high concentration of transactions associated with everyday merchant categories in a particular region may indicate that the user's home is in that particular region. For example, it may be determined that a user's home is in a particular region based on the number of such transactions (including the actual number or a relative number based on other transactions) in that region meeting a threshold.

With continued reference to FIG. 3, at step 314, process 300 may include generating an interaction signature for each user identifier based on the region of each interaction associated with the corresponding user identifier. This may result in a plurality of interaction signatures. For example, the interaction signature for a user may be based on the region identifiers of each region in which an interaction for the user identifier corresponding to that user took place. In some non-limiting embodiments or aspects, the interaction signature may be based on the time of the interaction. In some non-limiting embodiments or aspects, the interaction signature may be generated using the same method as generating the transaction signature, but based on the interaction data instead of the transaction data. In some non-limiting embodiments or aspects, an interaction signature may be generated for only user identifiers associated with interactions located within a predetermined minimum number of unique regions (e.g., an interaction signature is only generated if interactions associated with the user identifier are located in at least three different regions).

In some non-limiting embodiments or aspects, more than one interaction signature may be associated with a user identifier. For example, an interaction signature may be generated based on a predetermined interval of time (e.g., every hour, every day, every week, and/or the like) such that each user identifier has an interaction signature for each interval of time over a period of time. A longer predetermined interval of time (e.g., several weeks, a month, and/or the like) may result in a larger number of interactions associated with the interaction signature and a larger number of region identifiers and/or neighborhood identifiers associated with the interaction signature. An increased number of associated region identifiers and/or neighborhood identifiers will result in a more unique interaction signature. Therefore, a longer predetermined interval of time may increase the uniqueness of the interaction signature. The interaction signatures may be generated at the end of each predetermined interval of time. The interaction signatures for several intervals of time may be generated at once, such as when initiated by a user after specifying a number of intervals of time, or automatically.

In some non-limiting embodiments or aspects, a home region may be determined based on the interaction signatures. A home region may be determined based on the locations of frequent WiFi® connections. For example, a high concentration of interactions (e.g., a number of interactions or relative interactions satisfying a threshold and/or a length of connection over a specified period of time satisfying a threshold) associated with a particular WiFi® connection in a particular region may indicate that the user's home is in that particular region.

With continued reference to FIG. 3, at step 316, at least one transaction signature may be matched to at least one interaction signature. In some non-limiting embodiments or aspects, a transaction signature may be matched to an interaction signature based on at least one region identifier associated with the transaction signature and the interaction signature. In some non-limiting embodiments or aspects, the transaction signature may be matched to the interaction signature based on at least one neighborhood identifier associated with the transaction signature and the interaction signature. In some non-limiting embodiments or aspects, a match may be made for multiple intervals of time such that a separate match is made for each interval (e.g., every day, every week, etc.). A larger interval of time may result in an increase in the number of region identifiers and/or neighborhood identifiers associated with the transaction signature and/or interaction signature. A larger number of region identifiers and/or neighborhood identifiers may increase the uniqueness of the transaction signature and/or interaction signature. Matching a transaction signature with an interaction signature based on a higher number of region identifiers and/or neighborhood identifiers will result in an increased confidence that the transaction signature is associated with the same user as the user associated with the matched interaction signature. Therefore, a larger interval of time may increase the uniqueness of the transaction signature and/or interaction signature and increase confidence that the correct interaction signature is matched to the correct transaction signature. Matching a transaction signature to an interaction signature may include, for example, matching the transaction identifier associated with the transaction signature to the interaction identifier associated with the interaction signature.

In some non-limiting embodiments or aspects, matching at least one transaction signature to at least one interaction signature may be based on a difference between the transaction time of at least one transaction associated with the transaction signature and the time of interaction of at least one interaction associated with the transaction signature. If the difference between the transaction time and the time of interaction satisfies a predetermined threshold value (e.g., to be less than or equal to a predetermined value), the times may be determined to be a match. For example, an interaction may be required to have a time of interaction of an interaction associated with the interaction signature to occur within one day, one hour, or 30 minutes of a transaction time of a transaction associated with the transaction signature in the same region in order for the transaction signature and the interaction signature to be matched.

With continued reference to FIG. 3, at step 318, at least one account identifier may be linked to at least one user identifier based on the matching. For example, in some non-limiting embodiments or aspects, an account identifier may be linked to a user identifier if transaction signatures associated with the account identifier and interaction signatures of the user identifier are matched more than one time, or after a predetermined number of matches and/or percentage of matches (e.g., 90% of the transaction signatures associated with an account identifier are matched to interaction signatures associated with a user identifier with at least 10 transaction signatures analyzed). In response to more than one account identifier being linked to the same user identifier, or more than one user identifier being linked to the same user identifier, the predetermined number of matches and/or percentage of matches required to link the user identifier to the account identifier may be increased. A larger number of matches will increase the confidence that the linked account identifier and linked user identifier are associated with the same user. In some non-limiting embodiments or aspects, a common matching key may be created for a linked user identifier and account identifier.

In some non-limiting embodiments or aspects, if more than one account identifier is linked to one user identifier, and/or if more than one user identifier is linked to one account identifier, the predetermined threshold value for the difference between the transaction time and the time of interaction may be decreased. After the threshold is decreased, at least one transaction signature may be matched to at least one interaction signature. The matching may be based on the decreased threshold. At least one account identifier associated with the matched transaction signature may be linked to at least one user identifier associated with the matched interaction signature.

In some non-limiting embodiments or aspects, in response to more than one interaction signature being matched to the same transaction signature, or in response to more than one transaction signature being matched to the same interaction signature, a new set of regions may be generated. Generation of the new set of regions may be used to refine the results such that a single interaction signature can be linked to a single interaction signature. In some non-limiting embodiments or aspects, the new set of regions may be generated such that at least two of the new regions overlap with at least one of the regions associated with a linked transaction signature or a linked interaction signature. In some non-limiting embodiments or aspects, the new set of regions may be generated such that two or more interactions signatures and/or two or more interaction signatures that were located in the same original region are located in at least two different new regions.

In some non-limiting embodiments or aspects, the new set of regions (e.g., a plurality of new regions) may be generated such that the average size of the new regions is smaller than the average size of the original regions. For example, the new set of regions may contain a higher number of regions than the original set of regions. The new set of regions may split one or more original region into two or more new regions. In some non-limiting embodiments or aspects, at least one of the new regions may be larger than the original regions (e.g., one or more original regions with no transactions or interactions may be combined to make a larger region). In some non-limiting embodiments or aspects, the new set of regions may include the same boundary lines as the original set of regions in addition to new boundary lines for the generation of the new regions.

Once the new set of regions is generated, the new region for each transaction based on the transaction location is determined. The new region for each interaction based on the interaction location may also be determined. In some non-limiting embodiments or aspects, a new transaction signature and a new interaction signature may be generated based on the new regions associated with each transaction and interaction. In some non-limiting embodiments or aspects, the new interaction signature and new transaction signature may be matched based on the new regions associated with the new interaction signature and new transaction signature. In some non-limiting embodiments or aspects, the account identifier associated with the matched new transaction signature may be linked to the user identifier associated with the new interaction signature.

In some non-limiting embodiments or aspects, the new regions may only be determined for the transactions associated with a portion of the account identifiers and/or interactions associated with a portion of the user identifiers. For example, for account identifiers that are linked in a one-to-one relationship with user identifiers, no new interaction signatures or transaction signatures may be generated for the interactions and transactions associated with the account identifiers and user identifiers.

In some non-limiting embodiments or aspects, the new regions may be generated if no transaction signature is matched to an interaction signature. For example, if no matches are made, the new set of regions may include a fewer number regions than the set of original regions and/or the new regions may be larger in geographic size than the original regions.

In some non-limiting embodiments or aspects, the generation of the new set of regions may occur before the linking step of 318 such that a new set of regions is generated in response to more than one interaction signature being matched to the same transaction signature (e.g., a many-to-one match) or in response to more than one transaction signature being matched to the same interaction signature (e.g., a one-to-many match). Generation of the new set of regions may be used to refine the results such that a single transaction signature can be matched to a single interaction signature (e.g., a one-to-one match). In some non-limiting embodiments or aspects, the generation of new sets of regions may be repeated until a one-to-one match is achieved.

In some non-limiting embodiments or aspects, in response to more than one interaction signature being matched to the same transaction signature, or in response to more than one transaction signature being matched to the same interaction signature, the predetermined interval of time of the interaction signatures and/or the transaction signatures may be lengthened and a new set of interaction signatures and transaction signatures may be generated. A lengthened predetermined interval of time may result in more interactions and/or transactions being included in each interaction signature and transaction signature. The additional interactions and transactions may increase the number of regions and/or neighborhoods associated with the interaction signature and/or transaction signature, resulting in more unique interaction signatures and/or transaction signatures. This will also result in a decreased likelihood that an interaction signature will be matched to a transaction signature, which will decrease the number of multiple matches to the same transaction signature or interaction signature. Therefore, lengthening the predetermined interval of time of the interaction signatures and/or the transaction signatures may result in increased uniqueness of the interaction signatures and/or transaction signatures and increase confidence in a single match of a transaction signature to an interaction signature.

In some non-limiting embodiments or aspects, in response to at least one interaction signature not being matched to a transaction signature, or in response to at least one transaction signature not being matched to an interaction signature, the predetermined interval of time of the interaction signatures and/or the transaction signatures may be shortened and a new set of interaction signatures and transaction signatures may be generated. A shortened predetermined interval of time may result in fewer interactions and/or transactions being included in each interaction signature and transaction signature. The fewer interactions and transactions may decrease the number of regions and/or neighborhoods associated with the interaction signature and/or transaction signature, resulting in less unique interaction signatures and/or transaction signatures. This will also result in an increased likelihood that an interaction signature will be matched to a transaction signature, which will increase the number of matches between transaction signatures and interaction signatures.

In some non-limiting embodiments or aspects, the lengthening or shortening of the predetermined interval of time of the interaction signatures and/or the transaction signatures may occur before the linking step of 318. The lengthening or shortening of the predetermined interval of time of the interaction signatures and/or the transaction signatures may be repeated for all or a subset of the interaction signatures and/or transaction signatures until a one-to-one match is achieved.

In some non-limiting embodiments or aspect, the lengthening or shortening of the predetermined interval of time of the interaction signatures and/or the transaction signatures and/or the generation of the new set of regions may occur in response to more than one account identifier being linked to the same user identifier, or more than one user identifier being linked to the same account identifier.

In some non-limiting embodiments or aspects, a match score may be generated to determine the likelihood of a match between a user identifier and an account identifier. In some non-limiting embodiments or aspects, a match score may be generated for a potential match between each potential pair of user identifier and account identifier. The match score may be generated utilizing an algorithm, such as a pairwise alignment algorithm, dynamic time warping, Needleman-Wunsch algorithm, and/or the like. The match score may increase confidence that the match is correct. In some non-limiting embodiments or aspects, the match score may be calculated by comparing the neighborhoods and/or regions associated with each transaction signature associated with the account identifier to the neighborhoods and/or regions associated with each interaction signature associated with the user identifier. In some non-limiting embodiments, only a subset of the transaction signatures is compared to a subset of the interaction signatures. The subset may be based on the transaction signatures and interaction signatures being associated with a specified date range and/or time interval range.

In some non-limiting embodiments or aspects, when calculating a match score, each pair of regions and/or neighborhoods (e.g., for each region and/or neighborhood of the interaction signature of the user identifier compared to a region and/or neighborhood of the transaction signature of the account identifier or vice versa) may be assigned a value. For example, if the user identifier and the account identifier are associated with multiple interaction signatures and transaction signatures, then the interaction signatures may be compared to the transaction signatures that encompass the same time interval as the respective interaction signature. If both the transaction signature and the interaction signature are associated with the same region and/or neighborhood, then a match value (e.g., a value of 1) may be added to the match score of the pair for each region that the transaction signature and the interaction signature have in common. If the transaction signature and the interaction signature are associated with an unequal number of regions and/or neighborhoods, such that either the transaction signature or the interaction signature is associated with a higher number of regions and/or neighborhoods than the other, then for each extra region and/or neighborhood, a gap penalty value (e.g., a value of −0.5) may be added to the match score which is lower than the match value and may be a negative value.

In some non-limiting embodiments or aspects, if the interaction signature is associated with a region and/or neighborhood that is not associated with the transaction signature, and the transaction signature is associated with a region and/or neighborhood that is not associated with the interaction signature, then a distance value is calculated for the mismatched regions and/or neighborhoods which is added to the match score. For example, the distance value may be calculated based on a distance between the mismatched regions and/or neighborhoods (d) and the maximum (max) distance of the regions and/or neighborhoods ($d_{max}$). The max distance is the largest distance between any two regions and/or neighborhoods. The max distance may be calculated based on the distance between the centroids of the regions and/or neighborhoods. The distance between the mismatched regions and/or neighborhoods may also be calculated based on the distance between the centroids of the regions and/or neighborhoods. The distance value can then be calculated as $1-d/d_{max}$. If d is equal to $d_{max}$, then the distance value would be zero, resulting in no match between the region of the user identifier and the region of the account identifier. If an interaction or transaction is located in more than one neighborhood, each neighborhood of the interaction or transaction may be compared in order to find the best match (e.g. the highest value). In some non-limiting embodiments or aspects, the distance values added to the match score may be the highest distance values calculated based on all of the possible combinations between the regions and/or neighborhoods of the transaction signature and the regions and/or neighborhoods of the interaction signature.

In some non-limiting embodiments or aspects, the total match score for a pair of the user identifier and account identifier may be calculated by adding each of the gap penalties, match values, and distance values of all transaction signatures and interaction signatures associated with the user identifier and account identifier. A higher sum value indicates a higher relevance and more robust match between the user identifier and the account identifier. For example, if the sum value satisfies (e.g., meets or exceeds) a predetermined threshold value, it may be determined that the match is a confident match. In some non-limiting embodiments, only a subset of the transaction signatures and interaction signatures associated with the user identifier and account identifier may be used to compute the total match score (e.g., only the transaction signatures and interaction signatures associated with a specified date range).

In some non-limiting embodiments or aspects, the use of the total match score and neighborhoods may provide benefits such as allowing for allowing for transactions and interactions that occur at different times, and thus different locations, to still be able to be correlated to each other. The use of the total match score and neighborhoods may also reduce the computational resources necessary to calculate the distance value compared to calculating the distance value using the latitudinal and longitudinal coordinates of each interaction and transaction, thereby improving the speed and efficiency of the computing device.

Figure 4:
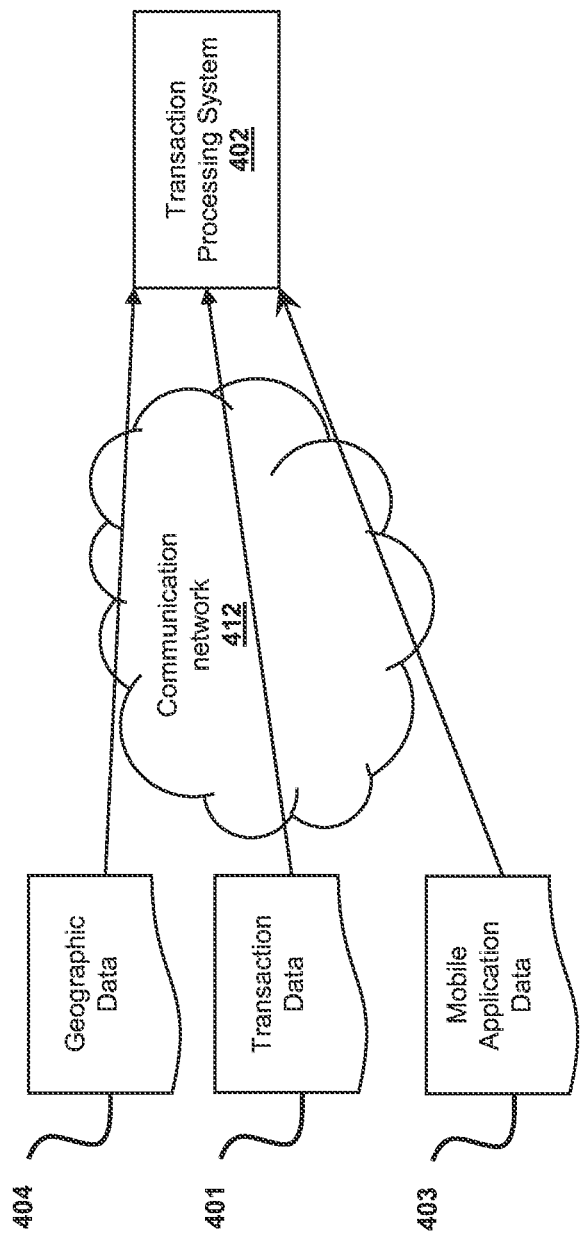
FIG. 4 is a diagram of a non-limiting embodiment or aspect of an implementation of a non-limiting embodiment or aspect of the process shown in FIG. 3 according to the principles of the presently disclosed subject matter.

Referring now to FIG. 4, FIG. 4 is a diagram of a non-limiting embodiment of a system 400 relating to process 300 shown in FIG. 3. As shown in FIG. 4, the system 400 may include transaction data 401, a transaction processing system 402, mobile application data 403, geographic data 404, and a communication network 412. The transaction processing system 402 may be the same or similar to the transaction processing system 102 described in FIG. 1. The communication network 412 may be the same or similar to the communication network 112 described in FIG. 1.

With continued referenced to FIG. 4, the transaction processing system 402 may receive mobile application data 403. The mobile application data 403 may be communicated to the transaction processing system 402 through a communication network 412. The mobile application data 403 may be received from cellular phone network providers, merchant systems, issuer systems, mobile application owners, user devices, and/or the like. In some non-limiting embodiments or aspects, the user device may be the same or similar to the customer device 106. Transaction data 401 may be communicated to the transaction processing system 402 through a communication network 412. The transaction data may be received from merchant systems, issuer systems, user devices, electronic wallet provider systems, acquirer systems, and/or the like. The geographic data 404 may include maps, addresses, dimensions, geographic coordinates, and/or the like of a geographic area, such as a city, state, country, and/or the like. The geographic data 404 may be communicated to the transaction processing system 402 through a communication network 412. The geographic data 404 may be received from a third party, such as geographic information systems, a web mapping service, and/or the like.

With continued reference to FIG. 4, the transaction processing system 402 may generate a plurality of regions within a geographic area based on the geographic data 404. Each region may be associated with a region identifier. The number of initial regions may be predefined. In some non-limiting embodiments, the number of regions may be calculated using an algorithm based on geographic and/or population data of the geographic area.

With continued reference to FIG. 4, the transaction processing system 402 may process the received transaction data 401. The transaction data 401 may include transactions between a plurality of accounts and a plurality of merchants and may include an account identifier and a transaction location. Processing the transaction data 401 may include determining a region of each of the transactions based on the transaction data 401. The transaction processing system 402 may also process the received mobile application data 403. The mobile application data 403 may include interactions between a plurality of mobile device users and at least one mobile application and may include a user identifier and an interaction location. Processing the mobile application data 403 may include determining a region of each of the interactions based on the mobile application data 403.

With continued reference to FIG. 4, the transaction processing system 402 may generate a transaction signature for each account identifier based on the regions of each transaction initiated with the account identifier. The transaction processing system 402 may also generate an interaction signature for each user identifier based on the region of each interaction initiated with the user identifier.

With continued reference to FIG. 4, the transaction processing system 402 may match at least one transaction signature to at least one interaction signature. The transaction processing system 402 may then link at least one account identifier to at least one user identifier based on matching the at least one transaction signature to at least one interaction signature.

With continued reference to FIG. 4, in some non-limiting embodiments or aspects, if more than one account identifier is linked to one user identifier, or if more than one user identifier is linked to one account identifier, the transaction processing system 402 may regenerate a new set of regions within the geographic area. The new set of regions may be generated such that at least two interactions or at least two transactions that were in the same original region are located in two separate new regions. The transaction processing system 402 may then generate new transaction signatures and new interaction signatures based on the new regions of the transactions and interactions. The transaction processing system 402 may then match at least one new transaction signature to at least one new interaction signature. The transaction processing system 402 may then link one account identifier to one user identifier based on the matching of the transaction signatures and the interaction signatures.

With continued reference to FIG. 4, in some non-limiting embodiments or aspects, the transaction processing system 402 may generate the transaction signature based on a transaction time included with the transaction data 401. In some non-limiting embodiments or aspects, the transaction processing system 402 may generate the interaction signature based on a time of interaction included with the mobile application data 403.

With continued reference to FIG. 4, in some non-limiting embodiments or aspects, the transaction processing system 402 may match a transaction signature to an interaction signature based on a difference between the transaction time and the time of interaction. The difference may satisfy a predetermined threshold value. For example, the transaction time for a transaction associated with the transaction signature may be matched if occurring within one (1) hour of the time of interaction for an interaction associated with the interaction signature. If more than one account identifier is linked to one user identifier, or more than one user identifier is linked to one account identifier, the transaction processing system 402 may change the predetermined threshold value (e.g., shorten or lengthen the threshold value). After the predetermined threshold value is changed, the transaction processing system 402 may rematch the transaction signatures to the interaction signatures based on the updated predetermined threshold value. The transaction processing system 402 may link at least one account identifier to at least one user identifier based on matching the interaction signature and the transaction signature.

With continued reference to FIG. 4, in some non-limiting embodiments or aspects, the transaction processing system 402 may generate a plurality of neighborhoods based on the geographic areas. Each neighborhood may include a center region as well as all regions that share at least a portion of their border with the center region. The transaction processing system 402 may determine a neighborhood associated with each transaction and each interaction based on the locations of the transactions and interactions. The transaction processing system 402 may generate a match score. The match score may indicate the likelihood of a match between a user identifier and an account identifier or a match between a transaction signature and an interaction signature. The match score may be based on the distance between the neighborhood of an interaction associated with an interaction signature and the neighborhood of a transaction associated with a transaction signature. The match score may be based on the transactions and interactions of a single transaction signature and single interaction signature, or the match score may be based on all of the transaction signatures associated with an account identifier and all of the interaction signatures associated with a user identifier. The transaction processing system 402 may match a transaction signature to an interaction signature based on the match score, and/or the transaction processing system 402 may link a user identifier to an account identifier based on the match score. A match or link may be established if the match score satisfies a certain threshold value.

Although the disclosed subject matter has been described in detail for the purpose of illustration based on what is currently considered to be the most practical and preferred embodiments or aspects, it is to be understood that such detail is solely for that purpose and that the disclosed subject matter is not limited to the disclosed embodiments or aspects, but, on the contrary, is intended to cover modifications and equivalent arrangements that are within the spirit and scope of the appended claims. For example, it is to be understood that the presently disclosed subject matter contemplates that, to the extent possible, one or more features of any embodiment or aspect can be combined with one or more features of any other embodiment or aspect.

What is claimed is:

1. A computer-implemented method, comprising:
generating, with at least one processor, a plurality of regions within a geographic area, each region of the plurality of regions associated with a region identifier;
determining, with at least one processor, a region of the plurality of regions for each transaction of a plurality of transactions conducted between an account of a first user and a plurality of merchants initiated using an account identifier of the account based on transaction data comprising, for each transaction, the account identifier, a transaction time, and a transaction location;
determining, with at least one processor, a region of the plurality of regions for each interaction of a plurality of interactions between the first user and at least one mobile application of a mobile device associated with a user identifier based on mobile application data comprising, for each interaction, the user identifier, an interaction time, and an interaction location, the transaction data and the mobile application data do not comprise a common unique identifier, wherein determining the region of the plurality of regions for each transaction of the plurality of transactions and/or the region of the plurality of regions for each interaction of the plurality of interactions comprises applying at least one geographic information system (GIS) tool to each transaction location and/or interaction location to match the transaction location and/or interaction location to a region of the plurality of regions;
generating, with at least one processor, a transaction signature for the account identifier based on the region and transaction time for each transaction of the plurality of transactions;
generating, with at least one processor, an interaction signature for the user identifier based on the region and interaction time for each interaction of the plurality of interactions;
generating, with at least one processor, a match score between the account identifier and the user identifier based on comparing the transaction signature with the interaction signature; and
in response to the match score satisfying a threshold, linking, with at least one processor in at least one database, the account identifier to the user identifier.

2. The computer-implemented method of claim 1, wherein generating the match score comprises applying at least one of a pairwise alignment algorithm, a dynamic time warping algorithm, and a Needleman-Wunsch algorithm to the transaction signature and the interaction signature.

3. The computer-implemented method of claim 1, wherein generating the match score comprises comparing the regions associated with the transaction signature to the regions associated with the interaction signature.

4. The computer-implemented method of claim 3, further comprising:
determining, with at least one processor, that a subset of the transaction signature and a subset of the interaction signature are associated with a common time range; and
only comparing the regions associated with the subset of the transaction signature and the subset of the interaction signature associated with the common time range.

5. The computer-implemented method of claim 1, wherein generating the match score comprises:
comparing, with at least one processor, the regions associated with the transaction signature and interaction signature associated with a common time range;
incrementing, with at least one processor, the match score for each common region between the transaction signature and the interaction signature associated with the common time range; and
reducing, with at least one processor, the match score for each non-matching region between the transaction signature and the interaction signature associated with the common time range.

6. The computer-implemented method of claim 5, further comprising:
for each non-matching region between the transaction signature and the interaction signature associated with the common time range, determining, with at least one processor, a distance value between the non-matching regions; and
adjusting, with at least one processor, the match score based on the distance value.

7. The computer-implemented method of claim 6, wherein determining the distance value between the non-matching regions comprises:
determining, with at least one processor, a first distance (d) between the non-matching regions;
determining, with at least one processor, a second distance ($d_{max}$) comprising a largest distance between any two regions of the plurality of regions; and
determining, with at least one processor, the distance value based on $1-(d/d_{max})$.

8. The computer-implemented method of claim 7, wherein the first distance and/or the second distance are determined based on a distance between centroids of the regions.

9. A system, comprising:
at least one processor; and
at least one non-transitory computer readable medium including one or more instructions that, when executed by the at least one processor, cause the at least one processor to:
determine a region of the plurality of regions for each transaction of a plurality of transactions conducted between an account of a first user and a plurality of merchants initiated using an account identifier of the account based on transaction data comprising, for each transaction, the account identifier, a transaction time, and a transaction location;
determine a region of the plurality of regions for each interaction of a plurality of interactions between the first user and at least one mobile application of a mobile device associated with a user identifier based on mobile application data comprising, for each interaction, the user identifier, an interaction time, and an interaction location, the transaction data and the mobile application data do not comprise a common unique identifier, wherein determining the region of the plurality of regions for each transaction of the plurality of transactions and/or the region of the plurality of regions for each interaction of the plurality of interactions comprises applying at least one geographic information system (GIS) tool to each transaction location and/or interaction location to match the transaction location and/or interaction location to a region of the plurality of regions;
generate a transaction signature for the account identifier based on the region and transaction time for each transaction of the plurality of transactions;

generate an interaction signature for the user identifier based on the region and interaction time for each interaction of the plurality of interactions;

generate a match score between the account identifier and the user identifier based on comparing the transaction signature with the interaction signature; and in response to the match score satisfying a threshold, link, in at least one database, the account identifier to the user identifier.

10. The system of claim 9, wherein generating the match score comprises applying at least one of a pairwise alignment algorithm, a dynamic time warping algorithm, and a Needleman-Wunsch algorithm to the transaction signature and the interaction signature.

11. The system of claim 9, wherein generating the match score comprises comparing the regions associated with the transaction signature to the regions associated with the interaction signature.

12. The system of claim 11, wherein the one or more instructions cause the at least one processor to:
determine that a subset of the transaction signature and a subset of the interaction signature are associated with a common time range; and
only compare the regions associated with the subset of the transaction signature and the subset of the interaction signature associated with the common time range.

13. The system of claim 9, wherein generating the match score comprises:
comparing the regions associated with the transaction signature and interaction signature associated with a common time range;
incrementing the match score for each common region between the transaction signature and the interaction signature associated with the common time range; and
reducing the match score for each non-matching region between the transaction signature and the interaction signature associated with the common time range.

14. The system of claim 13, wherein the one or more instructions cause the at least one processor to:
for each non-matching region between the transaction signature and the interaction signature associated with the common time range, determine a distance value between the non-matching regions; and
adjust the match score based on the distance value.

15. The system of claim 14, wherein determining the distance value between the non-matching regions comprises:
determining a first distance (d) between the non-matching regions;
determining a second distance ($d_{max}$) comprising a largest distance between any two regions of the plurality of regions; and
determining the distance value based on $1-(d/d_{max})$.

16. The system of claim 15, wherein the first distance and/or the second distance are determined based on a distance between centroids of the regions.

17. A computer program product comprising at least one non-transitory computer-readable medium including one or more instructions that, when executed by at least one processor, cause the at least one processor to:
generate a plurality of regions within a geographic area, each region of the plurality of regions associated with a region identifier;
determine a region of the plurality of regions for each transaction of a plurality of transactions conducted between an account of a first user and a plurality of merchants initiated using an account identifier of the account based on transaction data comprising, for each transaction, the account identifier, a transaction time, and a transaction location;
determine a region of the plurality of regions for each interaction of a plurality of interactions between the first user and at least one mobile application of a mobile device associated with a user identifier based on mobile application data comprising, for each interaction, the user identifier, an interaction time, and an interaction location, the transaction data and the mobile application data do not comprise a common unique identifier, wherein determining the region of the plurality of regions for each transaction of the plurality of transactions and/or the region of the plurality of regions for each interaction of the plurality of interactions comprises applying at least one geographic information system (GIS) tool to each transaction location and/or interaction location to match the transaction location and/or interaction location to a region of the plurality of regions;
generate a transaction signature for the account identifier based on the region and transaction time for each transaction of the plurality of transactions;
generate an interaction signature for the user identifier based on the region and interaction time for each interaction of the plurality of interactions;
generate a match score between the account identifier and the user identifier based on comparing the transaction signature with the interaction signature; and
in response to the match score satisfying a threshold, link, in at least one database, the account identifier to the user identifier.

18. The computer program product of claim 17, wherein generating the match score comprises applying at least one of a pairwise alignment algorithm, a dynamic time warping algorithm, and a Needleman-Wunsch algorithm to the transaction signature and the interaction signature.

* * * * *